US009568316B2

(12) United States Patent
Johnson et al.

(10) Patent No.: US 9,568,316 B2
(45) Date of Patent: Feb. 14, 2017

(54) RING ARCHITECTURE FOR SEQUENTIAL OPERATION OF AN ATOMIC GYROSCOPE

(71) Applicant: THE CHARLES STARK DRAPER LABORATORY, INC., Cambridge, MA (US)

(72) Inventors: David M. S. Johnson, Somerville, MA (US); David L. Butts, Boston, MA (US); Richard E. Stoner, Framingham, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 456 days.

(21) Appl. No.: 14/214,767

(22) Filed: Mar. 15, 2014

(65) Prior Publication Data

US 2016/0298967 A1 Oct. 13, 2016

Related U.S. Application Data

(60) Provisional application No. 61/791,101, filed on Mar. 15, 2013.

(51) Int. Cl.
*G01B 9/02* (2006.01)
*G01C 19/62* (2006.01)
(Continued)

(52) U.S. Cl.
CPC ............... *G01C 19/62* (2013.01); *G01B 9/02* (2013.01); *G01C 19/58* (2013.01); *G01C 21/165* (2013.01); *G01C 21/18* (2013.01); *G01P 9/02* (2013.01)

(58) Field of Classification Search
CPC ......... G01C 19/62; G01C 21/18; G01C 19/58; G01C 21/165; G01P 9/02; G01B 9/02
See application file for complete search history.

(56) References Cited

U.S. PATENT DOCUMENTS 7,030,370 B1 * 4/2006 Crookston ............... H05H 3/02
250/251
7,317,184 B2 1/2008 Kasevich et al.
(Continued)

OTHER PUBLICATIONS

"Light Pulse Atom Interferometry at Short Interrogation Times for Inertial Navigation" David Butts, PhD Dissertation, Massachusetts Institute of Technology, Feb. 2012.*
(Continued)

*Primary Examiner* — Kara E Geisel
*Assistant Examiner* — Dominic J Bologna
(74) *Attorney, Agent, or Firm* — Lando & Anastasi, LLP

(57) ABSTRACT

Compact inertial measurement systems and methods based on atom interferometry. Certain examples provide a combination atomic accelerometer-gyroscope configured to recapture and cycle atom samples through atom interferometers arranged to allow the next measurement to use the atoms from the previous measurement. Examples of the apparatus provide inertial measurements indicative of rotation for different inertial axes by applying atom interferometry to a plurality of atom samples launched in opposite directions to allow for measurement of both acceleration and rotation rates. In some examples, the inertial measurement apparatus provide a combined atomic gyroscope and an atomic accelerometer in a compact six Degrees of Freedom (6 DOF) IMU.

26 Claims, 12 Drawing Sheets

(51) Int. Cl.
    *G01C 21/18*     (2006.01)
    *G01C 19/02*     (2006.01)
    *G01C 21/16*     (2006.01)
    *G01C 19/58*     (2006.01)

(56) References Cited

U.S. PATENT DOCUMENTS

| | | | |
|---|---|---|---|
| 7,847,924 B2 | 12/2010 | Aarons et al. | |
| 9,019,506 B1* | 4/2015 | Black | G01B 9/02 |
| | | | 356/450 |
| 2014/0016118 A1* | 1/2014 | Compton | G01N 21/00 |
| | | | 356/72 |
| 2014/0022534 A1* | 1/2014 | Strabley | G01P 21/00 |
| | | | 356/72 |

OTHER PUBLICATIONS

"Rotation sensing with a dual atom-interferometer Sagnac gyroscope" Gustayson et al., Class. Quantum Grav. Mar. 17, 2000, 2385-2398.*

Canuel et al.: "Six-Axis Inertial Sensor Using Cold-Atom Interferometry", Phsical Review Letters, vol. 97, No. 1, Jul. 1, 2006 (Jul. 1, 2006), XP055133825, ISSN: 0031-9007, DOI: 10.1103/PhysRevLett.97.010402,the whole document.

Myatt C J et al.: "Multiply Loaded Magneto-Optical Trap", Optics Letters, Optical Society of America, US, vol. 21, No. 4, Feb. 15, 1996 (Feb. 15, 1996), pp. 290-292, XP000628910, ISSN: 0146-9592, the whole document.

* cited by examiner

RING ARCHITECTURE FOR SEQUENTIAL OPERATION OF AN ATOMIC GYROSCOPE

CROSS REFERENCE TO RELATED APPLICATIONS

This application claims priority under 35 U.S.C. §119(e) to U.S. Provisional Application No. 61/791,101 filed on Mar. 15, 2013, which is herein incorporated by reference in its entirety.

BACKGROUND

Most precision navigation solutions rely on the Global Positioning System (GPS) to provide accurate positioning information. Despite the advent of several other Global Navigation systems (GNSS), these navigation aids may be unreliable or may not be available. Inertial navigation offers a self-contained navigation solution which provides relative position from a known starting point by integrating platform accelerations and rotation rates provided by an on-board inertial measurement unit (IMU) which consists of three accelerometers and three gyroscopes. An IMU can be used as a stand-alone navigation solution or it can be used to supplement other navigation methods such as a GNSS, for example. Atom interferometry, and more specifically light-pulse atom interferometry (LPAI), may provide precise inertial instruments to form an IMU, or to supplement conventional inertial measurement units and correct their errors to allow for longer periods of inertial-only navigation. The type of light pulses used may drive a variety of atomic state transitions, such as Raman transitions, Bragg transitions to form an atom interferometer, etc., as understood by those skilled in the art.

Conventional LPAI implementations are larger systems which require substantially more volume than is traversed by the atoms due to the associated mechanisms required to prepare, cool, and trap the atomic sample, resulting in the large size of these systems. Additionally, LPAIs typically have dead time between measurements to cool and prepare the atomic samples. This dead time reduces the maximum measurement rate for the LPAI. By the sampling theorem, this limits the bandwidth of an LPAI based IMU to half of the measurement rate. In order to avoid the bandwidth limit imposed by sample preparation, multiple (two or three) time-multiplexed LPAI instruments may be used for each axis, which again increases the size of the overall system, but allows for continuously sampling the inertial signal. Furthermore, in certain applications it is desirable to obtain inertial measurements for multiple axes. In order to create an LPAI based IMU having six Degrees of Freedom (6-DOF, three vector-space spanning (typically orthogonal) acceleration measurements and three rotation rate (or angle) measurements), three separate LPAI instruments (each functioning as an accelerometer and gyroscope) may typically be combined, as is standard practice for constructing conventional IMUs. Thus, creating a 6-DOF LPAI-based IMU may conventionally require twelve to eighteen separate LPAI instruments to provide a continuously sampling inertial instrument. By having multiple LPAI instruments, each having its own atom sample capture mechanisms, there is a substantial volume increase over what is theoretically necessary.

SUMMARY OF THE INVENTION

Aspects and embodiments relate to atom interferometry and, more specifically, are directed to providing compact inertial measurement systems and methods based on atom interferometry. Various embodiments provide a combination atomic accelerometer-gyroscope configured to recapture and cycle atom samples through atom interferometers arranged to allow the next measurement to use the atoms from the previous measurement. Various embodiments of atom interferometers arranged in a "ring" configuration, such as, a square shape, a circular or quasi-circular shape, an "L" shape, a vertex-sharing configuration, and other configurations based on the above with redundant, non-orthogonal axes, are discussed below. Recapturing of atom samples in a ring configuration allows the apparatus to be relatively compact and constrained to a near-planar geometry, as well as operate at a higher data rate than conventional sensors. The apparatus may allow generation of inertial measurements indicative of rotation for different inertial axes by applying atom interferometry to a plurality of atom samples launched in opposite directions to allow for measurement of both acceleration and rotation rates. In some embodiments, the inertial measurement apparatus may provide a combined atomic gyroscope and an atomic accelerometer in a compact six Degrees of Freedom (6 DOF) IMU. Furthermore, various embodiments may include conventional gyroscopes and accelerometers configured to supplement the atomic sensors. These sensors may be any other type of device which can sense acceleration, rotation, altitude, velocity, attitude, position, or other quantity which can be used to deduce position and/or velocity with respect to inertial space.

According to one embodiment, an inertial measurement apparatus based on atom interferometry comprises a vacuum chamber, a plurality of atom interferometers including at least a first atom interferometer and a second atom interferometer, the first atom interferometer being configured to generate a first measurement corresponding to a first inertial axis based on a first atom sample, and the second atom interferometer being configured to generate a second measurement corresponding to a second inertial axis based on the first atom sample, and a plurality of atom capture sites housed within the vacuum chamber, the plurality of atom capture sites including at least a first atom capture site and a second atom capture site, the first atom capture site being configured to capture the first atom sample and to provide the first atom sample to the first atom interferometer, and the second atom capture site being configured to recapture the first atom sample from the first atom interferometer, following the first measurement, and to provide the first atom sample to the second atom interferometer, the second atom capture site being further configured to capture a second atom sample different from the first atom sample and to provide the second atom sample to a respective atom interferometer of the plurality of atom interferometers.

According to another embodiment, an inertial measurement apparatus based on atom interferometry comprises a vacuum chamber, a plurality of atom interferometers including at least a first atom interferometer and a second atom interferometer, the first atom interferometer being configured to generate a first measurement corresponding to a common inertial input based on a first atom sample, and the second atom interferometer being configured to generate a second measurement corresponding to on the same common inertial input as the first atom sample, and a plurality of atom capture sites housed within the vacuum chamber, the plurality of atom capture sites including at least a first atom capture site and a second atom capture site, the first atom capture site being configured to capture the first atom sample and to provide the first atom sample to the first atom interferometer, and the second atom capture site being configured to recapture the first atom sample from the first atom interferometer, following the first measurement, and to provide the first atom sample to the second atom interferometer, the second atom capture site being further configured to capture a second atom sample different from the first atom sample and to provide the second atom sample to a respective atom interferometer of the plurality of atom interferometers.

In one example, the second atom capture site is configured to provide the second atom sample to the respective atom interferometer in a direction substantially counter-propagating relative to a direction of travel of the first atom sample. In another example, the second atom capture site is further configured to provide the second atom sample to the respective atom interferometer along a propagation axis substantially parallel to that of the first atom sample. The first atom interferometer may be disposed substantially orthogonal to the second atom interferometer. In one example, the second atom capture site is disposed between the first atom interferometer and the second atom interferometer.

According to one example, the plurality of atom interferometers form an atomic gyroscope configured to sequentially provide a first plurality of phase shift measurements corresponding to a plurality of orthogonal inertial axes based on interference of the first atom sample, and sequentially provide a second plurality of phase shift measurements substantially simultaneously with providing the first plurality of phase shift measurements, the second plurality of phase shift measurements corresponding to the plurality of orthogonal inertial axes and being based on interference of the second atom sample. These measurements may then be combined to determine the inertial input to the system. In one example, the first plurality of phase shift measurements and the second plurality of phase shift measurements are indicative of rotation relative to an inertial reference frame. In another example, the plurality of atom interferometers further form an atomic accelerometer, the first plurality of phase shift measurements and the second plurality of phase shift measurements being further indicative of an acceleration relative to the inertial reference frame. In one example, each of the plurality of atom capture sites is configured to recapture atoms received from at least one atom interferometer of the plurality of atom interferometers, and wherein at least one of the plurality of atom capture sites is further configured to capture atoms received from a source external to the plurality of atom interferometers.

In another example, the plurality of atom interferometers further includes additional (one or more) atom interferometers configured to generate additional measurements corresponding to a common inertial input based on the first atom sample, but providing different information than the first two atom interferometers.

In another example of the inertial measurement apparatus, the plurality of atom interferometers further includes a third atom interferometer configured to generate a third measurement corresponding to a third inertial axis based on the first atom sample, and the plurality of atom capture sites further includes a third atom capture site configured to recapture the second atom sample received from the second atom interferometer and to provide the second atom sample to the third atom interferometer. In one example, the first inertial axis, the second inertial axis and the third inertial axis are mutually orthogonal. In another example, the first measurement, the second measurement and the third measurement include phase shifts corresponding to interfering atoms of the first atom sample. In one example, the first measurement, the second measurement and the third measurement are indicative of a rotation relative to an inertial reference frame including the first inertial axis, the second inertial axis and the third inertial axis. In another example, the first measurement, the second measurement and the third measurement are further indicative of an acceleration relative to the inertial reference frame. The plurality of atom capture sites may be arranged in a ring configuration. In one example, each atom interferometer of the plurality of atom interferometers is disposed between a respective pair of atom capture sites of the plurality of atom capture sites. In another example, each atom capture site of the plurality of atom capture sites is disposed between at least two atom interferometers of the plurality of atom interferometers. In another example, each atom capture site of the plurality of atom capture sites is configured to sequentially capture and launch the first atom sample and the second atom sample. The first atom capture site may be further configured to recapture the first atom sample received from one of the plurality of atom interferometers and to provide the first atom sample that is recaptured to the first atom interferometer. In one example, the ring configuration includes a triangle configuration, the first atom capture site being further configured to recapture the first atom sample received from the third atom interferometer and to provide the first atom sample that is recaptured to the first atom interferometer.

According to another example of the inertial measurement apparatus, the plurality of atom interferometers further includes a third atom interferometer configured to generate a further measurement corresponding to the first inertial axis based on the second atom sample, and the plurality of atom capture sites further includes a third atom capture site configured to capture the second atom sample and to provide the second atom sample to the third atom interferometer. In one example, the third atom interferometer is aligned substantially parallel to the first atom interferometer. In another example, the first measurement and the further measurement corresponding to the first inertial axis are indicative of rotation relative to the first inertial axis. In another example, the first measurement includes a phase shift corresponding to interfering atoms of the first atom sample and the further measurement corresponding to the first inertial axis includes a phase shift corresponding to interfering atoms of the second atom sample.

The plurality of atom interferometers may further include a fourth atom interferometer configured to generate a further measurement corresponding to the second inertial axis based on the second atom sample, and the plurality of atom capture sites includes a fourth atom capture site configured to recapture the second atom sample from the third atom interferometer and to provide the second atom sample to the fourth atom interferometer. In one example, the fourth atom interferometer is aligned substantially parallel to the second atom interferometer. In another example, the first atom capture site is further configured to recapture the second atom sample from the fourth atom interferometer and to provide the second atom sample to the first atom interferometer. In another example, the second measurement and the further measurement corresponding to the second inertial axis are indicative of a rotation relative to the second inertial axis. In a further example, the second measurement includes a phase shift corresponding to interfering atoms of the first atom sample and the further measurement corresponding to the second inertial axis includes a phase shift corresponding to interfering atoms of the second atom sample. According to another example, the first atom interferometer, the second atom interferometer, the third atom interferometer and the fourth atom interferometer are arranged in a square configuration, and the plurality of atom capture sites are disposed at corners of the square configuration.

According to one example, at least two atom capture sites of the plurality of atom capture sites are configured to launch distinct atom samples substantially simultaneously. In one example, at least two atom interferometers of the plurality of atom interferometers are configured to receive the distinct atom samples and to operate substantially simultaneously to generate a plurality of phase shift measurements based on the distinct atom samples.

In another example, each of the plurality of atom capture sites includes a magneto-optical trap. In another example, each of plurality of atom capture sites is further configured to launch captured atoms at an initial non-zero velocity.

The inertial measurement apparatus may further comprise an optical assembly corresponding to at least one atom capture site of the plurality of atom capture sites, the optical assembly including at least one retro-reflector and being configured to trap atoms.

According to another example, each atom interferometer of the plurality of atom interferometers is configured to allow transfer of atoms between respective atom capture sites of the plurality of atom capture sites and to provide a light pulse sequence to atoms being transferred between the respective atom capture sites. In one example, the light pulse sequence is a Raman pulse sequence. In another example, the light pulse sequence is a Bragg pulse sequence. In another example, the light pulse sequence includes a pi/2-pi-pi/2 sequence. In another example, each atom interferometer includes at least one atom beam splitter configured to provide pi/2 pulses and an atom mirror configured to provide pi pulses of the light pulse sequence. In another example, each atom interferometer includes a pulse sequence which causes inertially sensitive atom interference.

Each atom interferometer of the plurality of atom interferometers may further include a respective optical assembly configured to provide the light pulse sequence. In one example, the first atom interferometer includes a first optical assembly configured to allow generation of the first measurement corresponding to the first inertial axis, and the second atom interferometer includes a second optical assembly configured to allow generation of the second measurement corresponding to the second inertial axis. In one example, the first atom interferometer includes a first optical assembly configured to allow generation of the first measurement corresponding to the common inertial inputs, and the second atom interferometer includes a second optical assembly configured to allow generation of the second measurement corresponding to the common inertial inputs.

In another example, the plurality of atom interferometers includes a third atom interferometer having a third optical assembly configured to allow generation of a third measurement corresponding to the same inertial inputs or those along a different direction. The inertial measurement apparatus may further comprise a third atom interferometer arranged substantially parallel to the first atom interferometer, a fourth atom interferometer arranged substantially parallel to the second atom interferometer, and a first optical assembly configured to provide a first light pulse sequence substantially simultaneously to the first atom interferometer and the third atom interferometer. The inertial measurement apparatus may further comprise a second optical assembly configured to provide a second light pulse sequence substantially simultaneously to the second atom interferometer and the fourth atom interferometer.

In one example, the inertial measurement apparatus further comprises at least one of a MEMS gyroscope and a MEMS accelerometer. The inertial measurement apparatus may further comprise a processor configured to combine at least one measurement generated by at least one atom interferometer of the plurality of atom interferometers with an output of the at least one of the MEMS gyroscope and the MEMS accelerometer.

In another example, the inertial measurement apparatus further comprises at least one of a magnetic shield, a thermal isolator and a vibration isolation platform.

Another embodiment is directed to a method for providing inertial measurements based on atom interferometry. The method may comprise capturing a plurality of distinct atom samples including at least a first atom sample and a second atom sample, sequentially generating a first plurality of measurements corresponding to a plurality of orthogonal inertial axes based on interference of the first atom sample, and sequentially generating a second plurality of measurements corresponding to the plurality of orthogonal inertial axes based on interference of the second atom sample.

In one example of the method, sequentially generating the first plurality of measurements and sequentially generating the second plurality of measurements are performed substantially in parallel. In one example, the first plurality of measurements and the second plurality of measurements are phase shift measurements. The method may further comprise determining rotation relative to the inertial axes based on at least one of the first plurality of measurements and the second plurality of measurements. The method may further comprise determining acceleration relative to the inertial axes based on at least one of the first plurality of measurements and the second plurality of measurements.

In one example, the method further comprises sequentially recapturing the first atom sample to allow sequentially generating the first plurality of measurements, and sequentially recapturing the second atom sample to allow sequentially generating the second plurality of measurements.

In one example, capturing the plurality of distinct atom samples includes capturing the plurality of distinct atom samples by a plurality of atom capture sites, and sequentially generating the first plurality of measurements and sequentially generating the second plurality of measurements are based on a plurality of atom interferometers. In one example, capturing the plurality of distinct atom samples further includes capturing the plurality of distinct atom samples from a source external to the plurality of atom interferometers. The plurality of atom capture sites and the plurality of atom interferometers may be arranged in series in a ring configuration, each atom capture site being disposed between adjacent atom interferometers of the plurality of atom interferometers. In one example, the plurality of atom interferometers includes four atom interferometers arranged in a square configuration and the plurality of atom capture sites includes four atom capture sites disposed at corners of the square configuration. The method may further comprise cycling the first atom sample in the ring configuration, and cycling the second atom sample in the ring configuration along a direction reciprocal to that of the first atom sample. In another example, the method further comprises launching the first atom sample in a first atom interferometer to generate a first measurement of the first plurality of measurements, and launching the second atom sample in a third atom interferometer parallel to the first atom interferometer to generate a first measurement of the second plurality of measurements, wherein the first atom sample and the second atom sample are launched in opposite directions. In one example, launching the first atom sample and the second atom sample include launching the first atom sample and the second atom sample with a substantially same velocity.

According to another example, capturing the plurality of distinct atom samples includes capturing the first atom sample by a first atom capture site of a plurality of atom capture sites and capturing the second atom sample by another one of the plurality of atom capture sites. In this example, the method further comprises providing the first atom sample to a first atom interferometer of a plurality of atom interferometers, generating by the first atom interferometer a first measurement corresponding to a first inertial axis based on the first atom sample, recapturing the first atom sample from the first atom interferometer by a second atom capture site of the plurality of atom capture sites, providing the first atom sample to a second atom interferometer of the plurality of atom interferometers, generating by the second atom interferometer a second measurement corresponding to a second inertial axis based on the first atom sample, and providing the second atom sample to a respective atom interferometer of the plurality of atom interferometers. In one example, capturing the first atom sample and capturing the second atom sample are performed substantially in parallel. In another example, providing the first atom sample to the first atom interferometer and providing the second atom sample to the respective atom interferometer are performed substantially in parallel. In another example, sequentially generating the first plurality of measurements includes generating by the first atom interferometer the first measurement and generating by the second atom interferometer the second measurement. In another example, providing the first atom sample to the first atom interferometer further includes launching the first atom sample, and providing the second atom sample to the respective atom interferometer further includes launching the second atom sample in a direction substantially counter-propagating relative to the first atom sample. According to another example, launching the second atom sample further includes launching the second atom sample along a propagation axis substantially parallel to that of the first atom sample. In one example, the first atom interferometer is substantially orthogonal to the second atom interferometer and the second atom capture site is disposed between a respective end of each of the first atom interferometer and the second atom interferometer. The method may further comprise recapturing the first atom sample from the second atom interferometer by a third atom capture site of the plurality of atom capture sites, providing the first atom sample to a third atom interferometer of the plurality of atom interferometers, and generating by the third atom interferometer a third measurement corresponding to a third inertial axis based on the first atom sample. In one example, the plurality of orthogonal inertial axes includes the first inertial axis, the second inertial axis and the third inertial axis, and the first plurality of measurements includes the first measurement, the second measurement and the third measurement.

According to another example, capturing the plurality of distinct atom samples further includes cooling and trapping the plurality of distinct atom samples using magneto-optic traps.

The method may further comprise providing a light pulse sequence to atoms of the first atom sample, and providing the light pulse sequence to atoms of the second atom sample. In one example, the light pulse sequence is a Raman pulse sequence. In another example, the light pulse sequence is a Bragg pulse sequence. In another example, the light pulse sequence is a pi/2-pi-pi/2 sequence. Providing the light pulse sequence to atoms of the first atom sample and providing the light pulse sequence to atoms of the second atom sample may be performed substantially simultaneously using the same optical assembly.

In another example, the method further comprises determining an inertial measurement based on an output of at least one of a MEMS gyroscope and a MEMS accelerometer.

According to another embodiment, an inertial measurement apparatus based on atom interferometry comprises a vacuum chamber, a plurality of atom capture sites housed within the vacuum chamber, the plurality of atom capture sites including at least a first atom capture site, a second atom capture site, and a third atom capture site, a plurality of interferometry regions disposed between the plurality of atom capture sites within the vacuum chamber, including a first interferometry region disposed between the first and second atom capture sites, and a second interferometry region disposed between the second and third atom capture sites, a first optical apparatus configured to provide a light pulse sequence to first interferometry region during transit of a atom sample through the first interferometry region, and a second optical apparatus configured to provide the light pulse sequence to the second interferometry region during transit of the first atom sample through the second interferometry region. The first atom capture site is configured to launch the first atom sample in a first propagation direction through the first interferometry region, and the inertial measurement apparatus is configured to generate a first measurement corresponding to a first inertial axis of the inertial measurement apparatus based on interaction of the first atom sample with the light pulse sequence in the first interferometry region. The second atom capture site is configured to recapture the first atom sample from the first interferometry region following the first measurement, and to launch the first atom sample in a second propagation direction through the second interferometry region, and the inertial measurement apparatus is configured to generate a second measurement corresponding to a second inertial axis of the inertial measurement apparatus based on interaction of the first atom sample with the light pulse sequence in the second interferometry region.

In one example, each of the plurality of atom capture sites includes a magneto-optic trap configured to capture and cool the atom sample(s). In one example, the third atom capture site is configured to recapture the first atom sample from the second interferometry region following the second measurement. The inertial measurement apparatus may have an L-shaped configuration, for example, wherein the plurality of interferometry regions further includes a third interferometry region disposed between the first and third atom capture sites. In another example, the inertial measurement has a ring configuration, wherein the plurality of atom capture sites further includes a fourth atom capture site, and the plurality of interferometry regions further includes a third interferometry region disposed between the third and fourth atom capture sites, and a fourth interferometry region disposed between the fourth and first atom capture sites.

In one example, the second propagation direction is substantially perpendicular to the first propagation direction, and the second inertial axis is substantially orthogonal to the first inertial axis.

In another example, the third atom capture site is configured to launch a second atom sample in a third propagation direction through the third interferometry region, and the inertial measurement apparatus is configured to generate a third measurement corresponding to the first inertial axis of the inertial measurement apparatus based on interaction of the second atom sample with the light pulse sequence in the third interferometry region. In this example, the first optical apparatus is configured to provide the light pulse sequence substantially simultaneously to the first and third interferometry regions, and the first and third interferometry regions are disposed substantially parallel to one another. In one example, the fourth atom capture site is configured to recapture the second atom sample from the third interferometry region following the third measurement, and to launch the second atom sample in a fourth propagation direction through the fourth interferometry region, the second and fourth interferometry regions are disposed substantially parallel to one another, and the inertial measurement apparatus is configured to generate a fourth measurement corresponding to the second inertial axis of the inertial measurement apparatus based on interaction of the second atom sample with the light pulse sequence in the fourth interferometry region. The second optical apparatus may be configured to provide the light pulse sequence substantially simultaneously to the second and fourth interferometry regions. In one example, the third propagation direction is substantially parallel and opposite to the first propagation direction, such that the first and second atom samples are substantially counter-propagating during transit through first and third interferometry regions, respectively.

In one example, the first and second optical apparatuses each comprise at least one frequency-tunable laser light source. In one example, the first optical apparatus includes two frequency tunable laser light sources configured to produce three laser beams, and a retro-reflector positioned opposite the two frequency tunable laser sources and configured to retro-reflect the three laser beams so as to generate the laser light pulse sequence in the first and third interferometry regions. In another example, at least one of the first and second optical apparatuses includes three frequency tunable laser light sources configured to produce three laser beams that generate the laser light pulse sequence. The light pulse sequence may be a three-pulse Raman sequence, for example. In one example, the light pulse sequence is a pi/2-pi-pi/2 Raman sequence.

According to another embodiment, an inertial measurement system comprises a vacuum chamber, a first light pulse atom interferometer (LPAI) disposed within the vacuum chamber and including first and second atom capture sites, and a first atom interferometry region disposed between the first and second atom capture sites, the first LPAI configured to launch first and second atom samples counter-propagating through the first atom interferometry region from the first and second atom capture sites, respectively, the first atom capture site being configured to recapture the second atom sample after its transit through the first atom interferometry region, and the second atom capture site being configured to recapture the first atom sample after its transit through the first atom interferometry region, and a first optical apparatus configured to generate a light pulse sequence in the first atom interferometry region, wherein the first LPAI configured to generate first inertial measurements based on interactions of the first and second atom samples with the light pulse sequence in the first atom interferometry region.

In one example, the inertial measurement system further comprises a second light pulse atom interferometer (LPAI) disposed within the vacuum chamber and including third and fourth atom capture sites, and a second atom interferometry region disposed between the third and fourth atom capture sites, the second LPAI configured to launch third and fourth atom samples counter-propagating through the second atom interferometry region from the third and fourth atom capture sites, respectively, the third atom capture site being configured to recapture the fourth atom sample after its transit through the second atom interferometry region, and the fourth atom capture site being configured to recapture the third atom sample after its transit through the second atom interferometry region, and a second optical apparatus configured to generate the light pulse sequence in the second atom interferometry region, wherein the second LPAI is configured to generate second inertial measurements based on interactions of the third and fourth atom samples with the light pulse sequence in the second atom interferometry region. In one example, the first and second LPAIs are disposed orthogonal to one another. In one example, the light pulse sequence is a pi/2-pi-pi/2 Raman sequence. In another example, the light pulse sequence includes a sequence of Bragg transitions.

According to another embodiment, an inertial measurement system comprises a vacuum chamber, and a first light pulse atom interferometer (LPAI) disposed within the vacuum chamber and including first and second atom capture sites, and a first atom interferometry region disposed between the first and second atom capture sites, the first LPAI configured to launch a first atom sample in a first direction through the first atom interferometry region from the first atom capture site to the second atom capture site, the second atom capture site being configured to recapture the first atom sample from the first atom interferometry region. The system further comprises a second LPAI disposed within the vacuum chamber and including third and fourth atom capture sites, and a second atom interferometry region disposed between the third and fourth atom capture sites and arranged substantially parallel with the first atom interferometry region, the second LPAI configured to simultaneously launch a second atom sample in a second direction through the second atom interferometry region from the third atom capture site to the fourth atom capture site, the fourth atom capture site being configured to recapture the second atom sample from the second atom interferometry region, wherein the second direction is substantially parallel and opposite to the first direction, such that the first and second atom samples counter-propagate through the first and second atom interferometry regions, respectively. The system further comprises a first optical apparatus configured to generate a light pulse sequence substantially simultaneously in the first and second atom interferometry regions, wherein the inertial measurement system is configured to generate inertial measurements based on interactions of the first and second atom samples with the light pulse sequence in the first and second atom interferometry regions, respectively.

In one example, the inertial measurement system further comprises a third LPAI disposed within the vacuum chamber and including a third atom interferometry region disposed between the second and third atom capture sites, the third LPAI configured to launch the first atom sample in a third direction through the third atom interferometry region from the second atom capture site to the third atom capture site, the third atom capture site being configured to recapture the first atom sample from the second atom interferometry region. The inertial measurement system may further comprise a fourth LPAI disposed within the vacuum chamber and including a fourth atom interferometry region disposed between the second and third atom capture sites and arranged substantially parallel with the third atom interferometry region, the fourth LPAI configured to launch the second atom sample in a fourth direction through the fourth atom interferometry region from the fourth atom capture site to the first atom capture site, the first atom capture site being configured to recapture the second atom sample from the fourth atom interferometry region, and a second optical apparatus configured to generate the light pulse sequence substantially simultaneously in the third and fourth atom interferometry regions, wherein the inertial measurement system is configured to generate further inertial measurements based on interactions of the first and second atom samples with the light pulse sequence in the third and fourth atom interferometry regions, respectively. In one example, the first and third atom interferometry regions are substantially orthogonal. In one example, the light pulse sequence is a pi/2-pi-pi/2 Raman sequence. In another example, the light pulse sequence includes a sequence of Bragg transitions.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
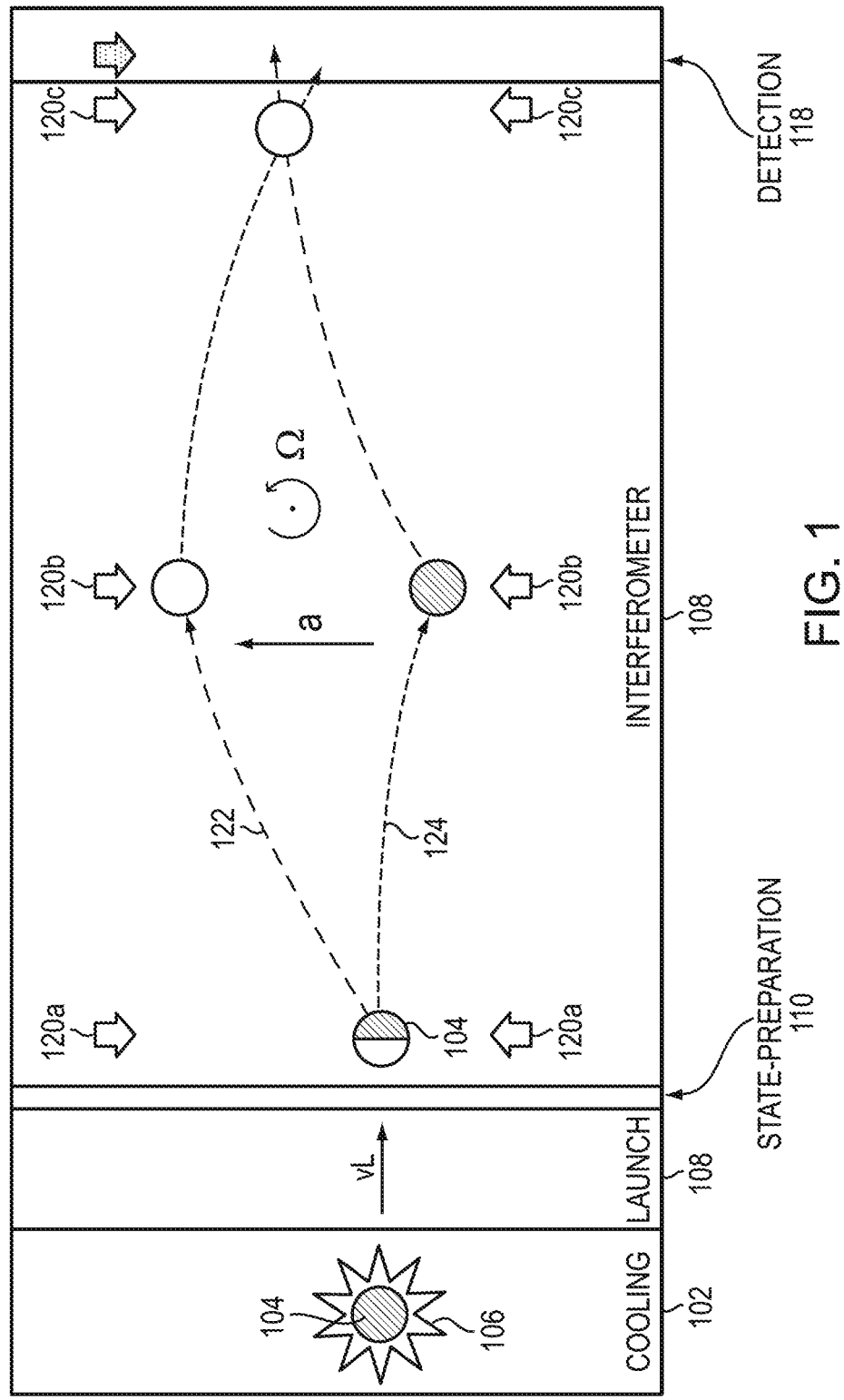
FIG. 1 is a schematic diagram illustrating one example of an atom interferometry measurement sequence using a laser light pulse sequence including a pi/2-pi-pi/2 pulse sequence, according to aspects of the invention.

Aspects and embodiments are directed to compact inertial measurement systems based on atom interferometry. In order to provide for a more compact LPAI IMU, certain embodiments use a combinatorial system, made up of three conventional accelerometers and three gyroscopes, along with an LPAI instrument which functions as both an accelerometer and a gyroscope and can measure accelerations and rotations which span a three dimensional space (typically orthogonal). In one embodiment, there is provided a 6 DOF atomic accelerometer and atomic gyroscope inertial measurement apparatus having a vacuum chamber volume that is limited by the physics of atom trajectories. In one example, an atomic inertial measurement apparatus configured according to aspects disclosed herein may have a volume of less than approximately 300 $cm^3$, substantially smaller than conventional systems with comparable performance. This system may operate without any external aiding, as discussed in more detail below; conversely it may also be used in a system with external aiding sensors. These sensors may be any other type of device which can sense acceleration, rotation, altitude, velocity, attitude, position, or other quantity which can be used to deduce position and/or velocity with respect to inertial space.

In some embodiments, a 6 DOF LPAI IMU may be configured to meet the sensitivity and bias stability requirements to achieve accuracy that is substantially similar to GPS accuracy for at least short duration missions. In one example, the duration of a mission may be approximately 20 minutes. In some embodiments, a 6 DOF LPAI IMU may have the sensitivity, such as the Velocity Random Walk (VRW) and Angle Random Walk (ARW) and bias stability to enable a 20 meter circular error probable (CEP) accuracy, at least for short duration missions of about 20 minutes. In one embodiment, an inertial measurement apparatus may be configured to have a volume of 300 $cm^3$.

Embodiments of systems and methods disclosed herein may have applications in various fields, and in particular the field of precision inertial guidance and navigation. For example, embodiments may be used to guide platforms such as strategic missiles, submarines, Unmanned Underwater Vehicles (UUV), Unmanned Aerial Vehicles (UAV), cruise missiles, aircraft, and tactical munitions. Other examples of applications may include commercial aviation, self-driving vehicles, robotic machinery, and personal navigation in GPS denied environments.

Reduction of the volume of various embodiments of atomic inertial measurement systems may be achieved by providing atom interferometer configurations, and particularly, atomic gyroscope configurations, that allow recapture of the atom sample(s). Recapture of atom samples dramatically decreases the dead-time between measurements by re-using atom samples used in a previous atom interferometer measurement. This reuse reduces the time required to cool the atoms because they are already near operating temperature. Thus, recapturing atom samples reduces cycle time and allows for a substantial increase, such as 10× to 100× increase, in data rate, which translates to a corresponding increase of 10× to 100× in bandwidth compared to a conventional LPAI. Recapturing atom samples enables high speed operation and is applicable to multiplexed as well as sequential systems.

According to certain embodiments, an inertial measurement apparatus may be configured to provide a recapturing 6 DOF LPAI gyroscope and accelerometer in a minimum (physics limited) volume. In various embodiments, the recapturing configuration allows for a single vacuum chamber to house all three inertially sensitive axes, rather than requiring three separate instruments with separate vacuum chambers for a 6 DOF IMU. Furthermore, by enabling recapture of atom samples, the total number of atom capture sites and atom interferometers required is reduced. For example, an inertial measurement apparatus configured to recapture atom samples may include only four atom interferometers arranged in a planar vacuum chamber rather than an orthogonal configuration of three separate vacuum chambers. Therefore complexity, volume, power consumption, and system cost are reduced.

In various embodiments, a plurality of atom samples may be captured and launched substantially simultaneously to generate inertial measurements. In some embodiments, an LPAI gyroscope or a combination of an LPAI gyroscope and accelerometer may use two counter-propagating laser cooled atom samples launched at a few meters per second ($V_L$) and interrogated by three equally spaced laser beams using Raman (or Bragg) transitions, as described and illustrated further below with reference to FIGS. 1 to 3C. Two oppositely launched atom samples (reciprocal operation with substantially parallel trajectories) allows distinguishing between acceleration and rotation. Acceleration is based on the sum of the two measurements based on the two oppositely launched atom samples, whereas rotation rate is based on the difference of the measurements. These samples may share the same trajectory (overlapping configuration) or they may be operated along different trajectories. In certain examples, the trajectories are typically equal and opposite, e.g. $vL\_1=-vL\_2$; however, this is not necessarily the case, provided that the velocity vectors are precisely known.

According to certain embodiments, an inertial measurement apparatus may include a plurality of atom interferometers arranged in a ring configuration, with atom capture sites disposed between adjacent atom interferometers, as shown for example in FIGS. 3A-C, and as discussed further below. The ring configuration enables recapturing operation of an LPAI gyroscope. In particular, the ring configuration allows for sequential 3-axis operation of the LPAI gyroscope, wherein measurements are obtained for each of the three inertial axes based on a plurality of atom samples launched substantially simultaneously in reciprocal, counter-propagating directions. The atom interferometer primarily measures deflection of the inertial atom trajectories with respect to the case of the instrument. By launching the counter-propagating pairs of atomic samples along trajectories which are contained in a plane, the full six-degrees of freedom of acceleration and rotation can be measured. This requires the measurement laser beams for the atom interferometer (the Raman laser beams in some embodiments) to be arranged such that they span the three-dimensional vector space (typically orthogonal). By making four measurements, sufficient information will be obtained to determine acceleration and rotation rates along all three directions.

The ring configuration also enables uniform precision over all 6 DOF for a combined atomic gyroscope and accelerometer. Furthermore, the ring architecture may allow for physics-limited volume of a 6 DOF (3 axis) IMU based on LPAI, since constraining the atomic trajectories in a plane produces the minimum vacuum chamber volume for a 6-DOF coriolis-force atomic interferometer. In some embodiments, the LPAI configuration allows launch and recapture or atom samples at any orientation with respect to local g (i.e. quasi-linear throw).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
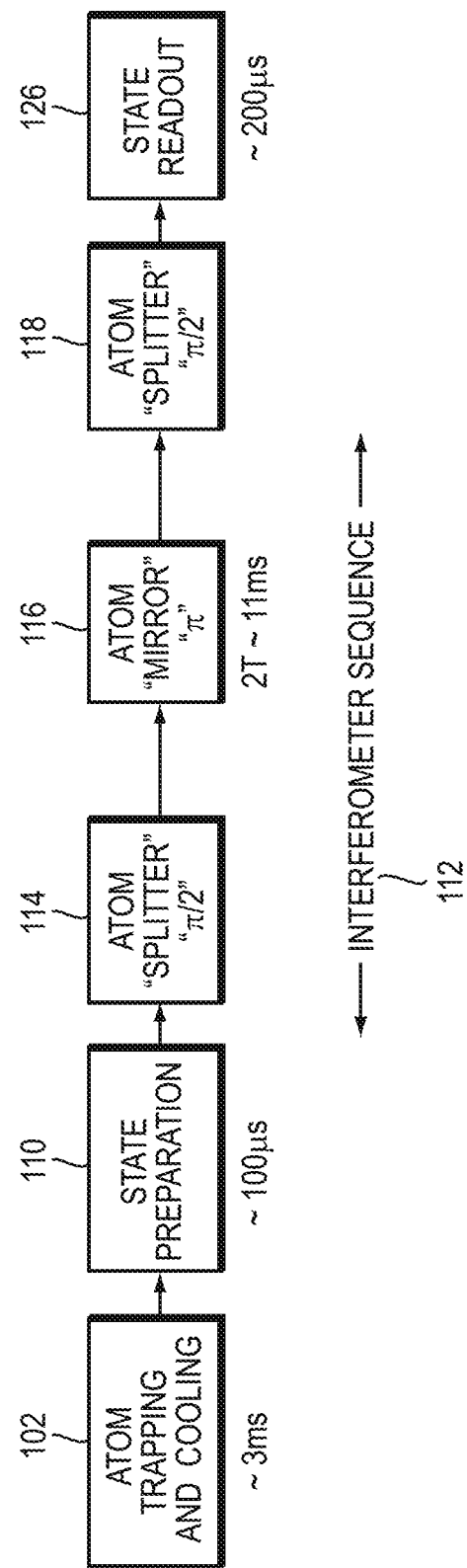
FIG. 2 is a flow diagram one of example of the atom interferometry measurement sequence corresponding to FIG. 1, according to aspects of the invention.

Referring to FIG. 1, there is illustrated one example of an atom interferometry measurement sequence using a laser light pulse sequence that creates an inertially sensitive signal. In one example, the laser light pulse sequence includes a pi/2-pi-pi/2 sequence of Raman transitions. However, in other examples, the light pulse sequence may include Bragg transitions, or may be any other form of light pulse sequence that creates an inertially sensitive signal. The measurement includes two samples of atoms being transferred between respective atom capture sites, as discussed further below. Each atom sample undergoes a pi/2-pi-pi/2 pulse sequence, but slight variations in the pulses for each interferometer may be allowed to compensate for the different Doppler shifts induced in each sample due to their common acceleration but different rotation rate. FIG. 2 is a corresponding flow diagram of the interferometry measurement sequence of FIG. 1.

Referring to FIGS. 1 and 2, a first state 102 is a trapping and cooling state in which the atom sample 104 is trapped at an atom capture site 106 and cooled to a temperature suitable for operation of the LPAI system, typically 10 micro-Kelvin. In one example, the atom capture site 106 may include a magneto-optical trap (MOT). In other examples, the atom capture site 106 may include any atom trapping and cooling mechanism. The atoms are then launched in opposite directions, as described above (step 108). The atom sample may be launched with an initial velocity, $V_L$, as represented by arrow 106, such as an initial velocity of approximately 4 m/s. In one example, this launch 108 may be done via a moving molasses obtained by changing the frequencies of the MOT beams so that the atom is cooled in a moving frame with respect to the instrument case. After launching, the atom sample 104 may be prepared in a specific atomic state (state preparation step 110). In other examples, the state preparation step 110 may be unnecessary. In some embodiments, the specific atomic state in which the atom sample 104 is prepared is the mF=0 magnetically insensitive hyperfine ground state of an alkali atom. The atoms sample 104 may be placed into the mF=0 state by dark state optical pumping. An interferometry sequence 112 is then applied to the trapped and cooled atom sample 104, which includes applying a light pulse sequence to the atom sample 104 and generating a measurement based on interference of the atom sample.

In LPAI, a light pulse sequence is provided by Raman laser beams to atoms that are in transit from the initial atom capture site 106 to a second atom capture site. During transit, the atom sample 104 is manipulated by light pulses configured to "split" and "reflect" atoms in order to create a Ramsey interferometer. The light pulses may be provided by an optical assembly which is attached to a platform or housing of the inertial measurement apparatus. The optical apparatus may serve multiple atom interferometry regions and may be a shared component between instruments, as discussed further below.

In one example, the light pulse sequence includes a pi/2-pi-pi/2 sequence as shown in FIG. 1, which is a three-pulse sequence based on Raman transitions. A first Raman pi/2 pulse comprising two oppositely directed beams 120a, is applied to act as an atom "splitter", thereby placing the atom sample 104 in a coherent superposition of wavepackets in states having different momenta (step 114 in FIG. 2). Application of the first Raman pi/2 pulse results in separation of the wavepackets after an interrogation time T, as illustrated schematically by dotted lines 122 and 124. A Raman pi pulse, also comprising two oppositely directed beams 120b, is then applied to act as an atom "mirror", thereby redirecting the momenta of the separated wavepackets so that the wavepackets overlap after a time T, as illustrated in FIG. 1 (step 116 in FIG. 2). A second Raman pi/2 pulse (beams 120c) is then applied to act as a detector and take the measurement (step 118). Accordingly, in various embodiments, an atom interferometer may include at least two of an atom beam splitter configured to provide pi/2 pulses and an atom mirror configured to provide pi pulses. The state readout (step 126) includes providing the measurement from the detector, as discussed further below.

FIG. 2 also includes examples of durations of the various steps. In one example, the interrogation time, T, may be approximately 5.5 milliseconds (ms), resulting the time of the interferometry sequence 120 being approximately 11 ms (2T). It is to be appreciated that the light pulse interferometry sequence of FIG. 1 is provided as one example and various embodiments may include atom interferometers configured to provide other light pulse sequences, and manipulate the atoms in other atomic states. Furthermore, atom interferometers may use the same laser beam delivery optics for cooling and trapping as well as measuring the inertial signal of the atoms, or may use different laser beams. Either configuration may be used in the embodiments discussed herein.

Figure 3A:
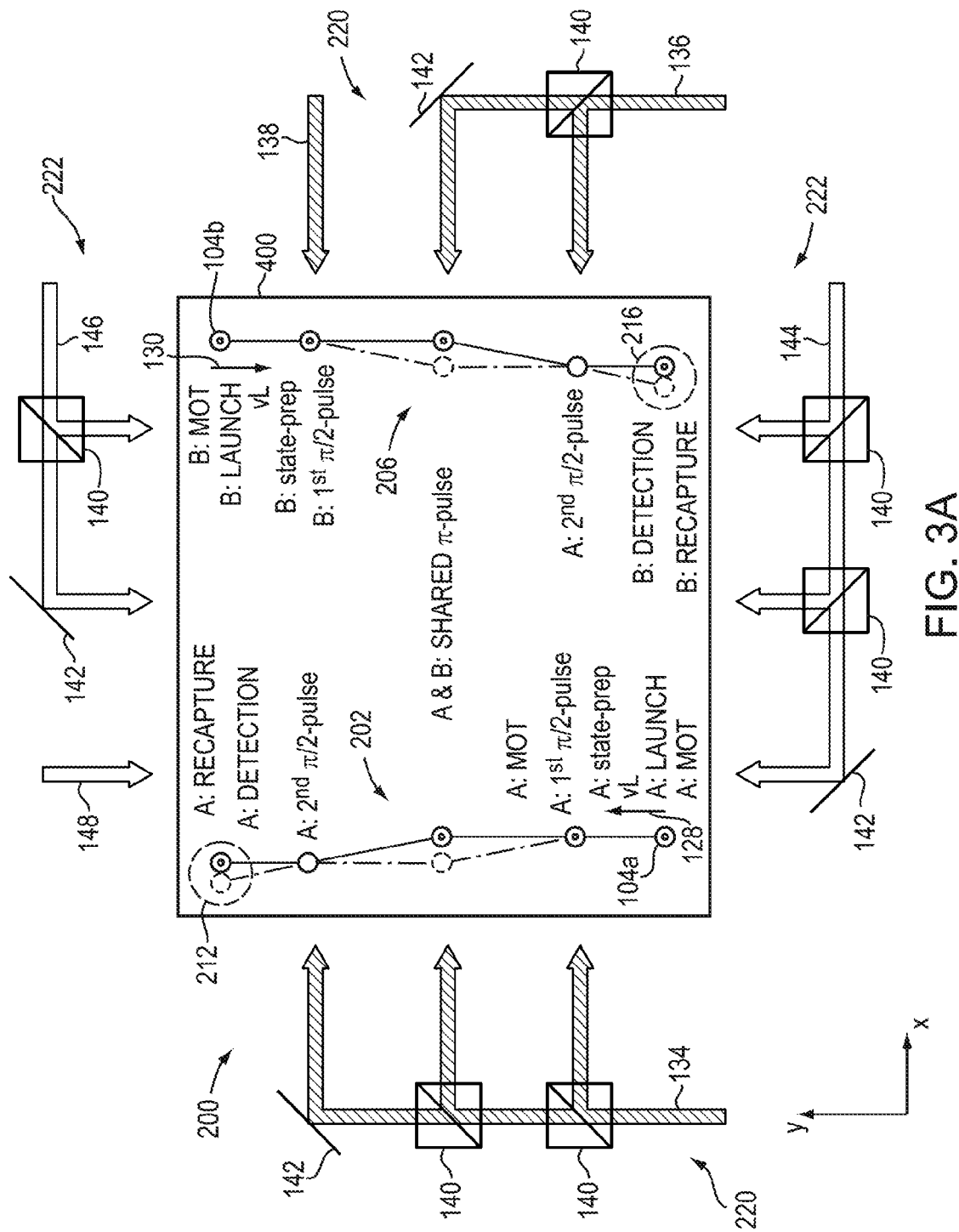
FIGS. 3A-C are schematic diagrams illustrating an example of an inertial measurement apparatus based on atom interferometry of two atom samples launched in counter-propagating directions to provide inertial measurements, according to aspects of the invention.
Figure 3B:
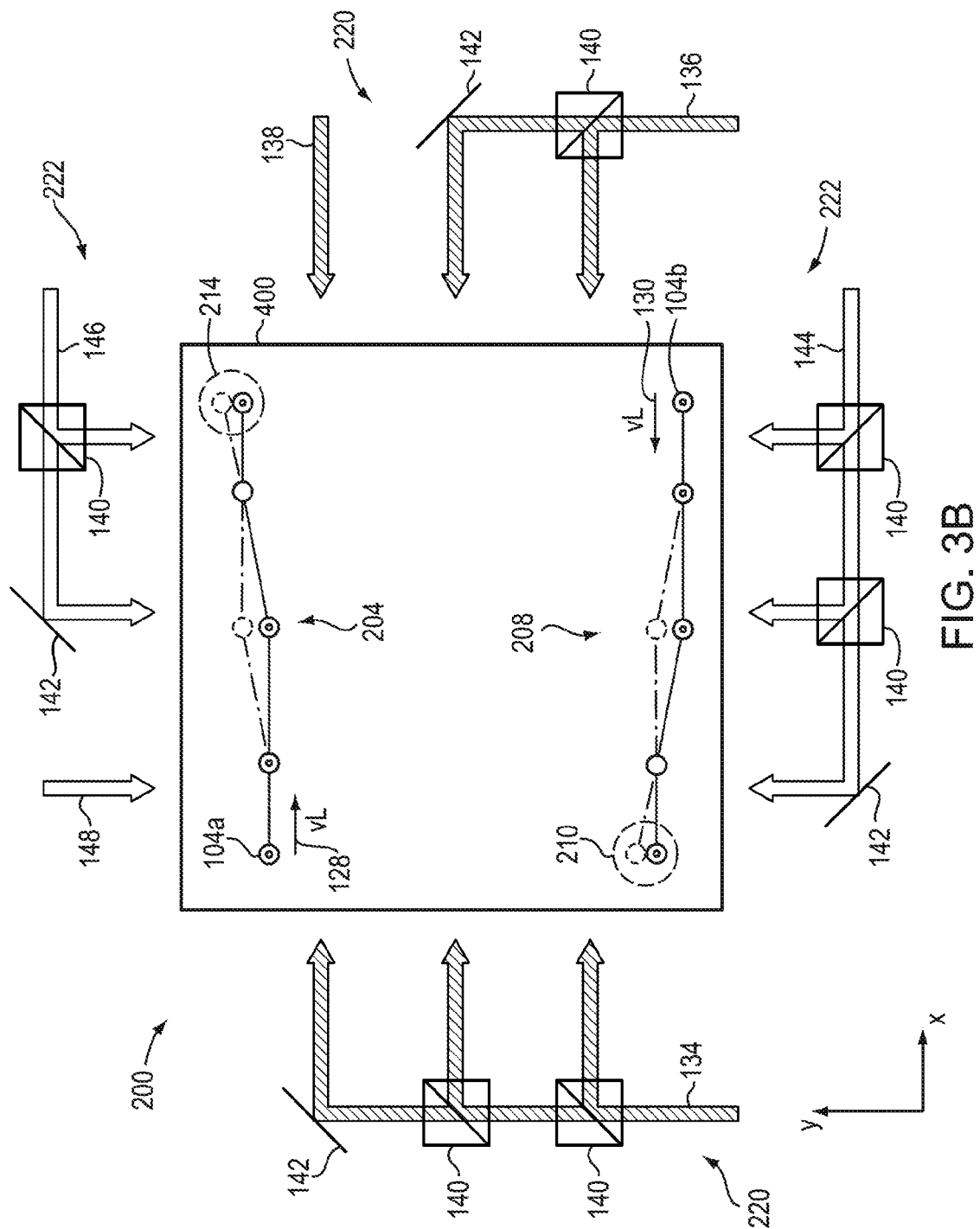
Figure 3C:
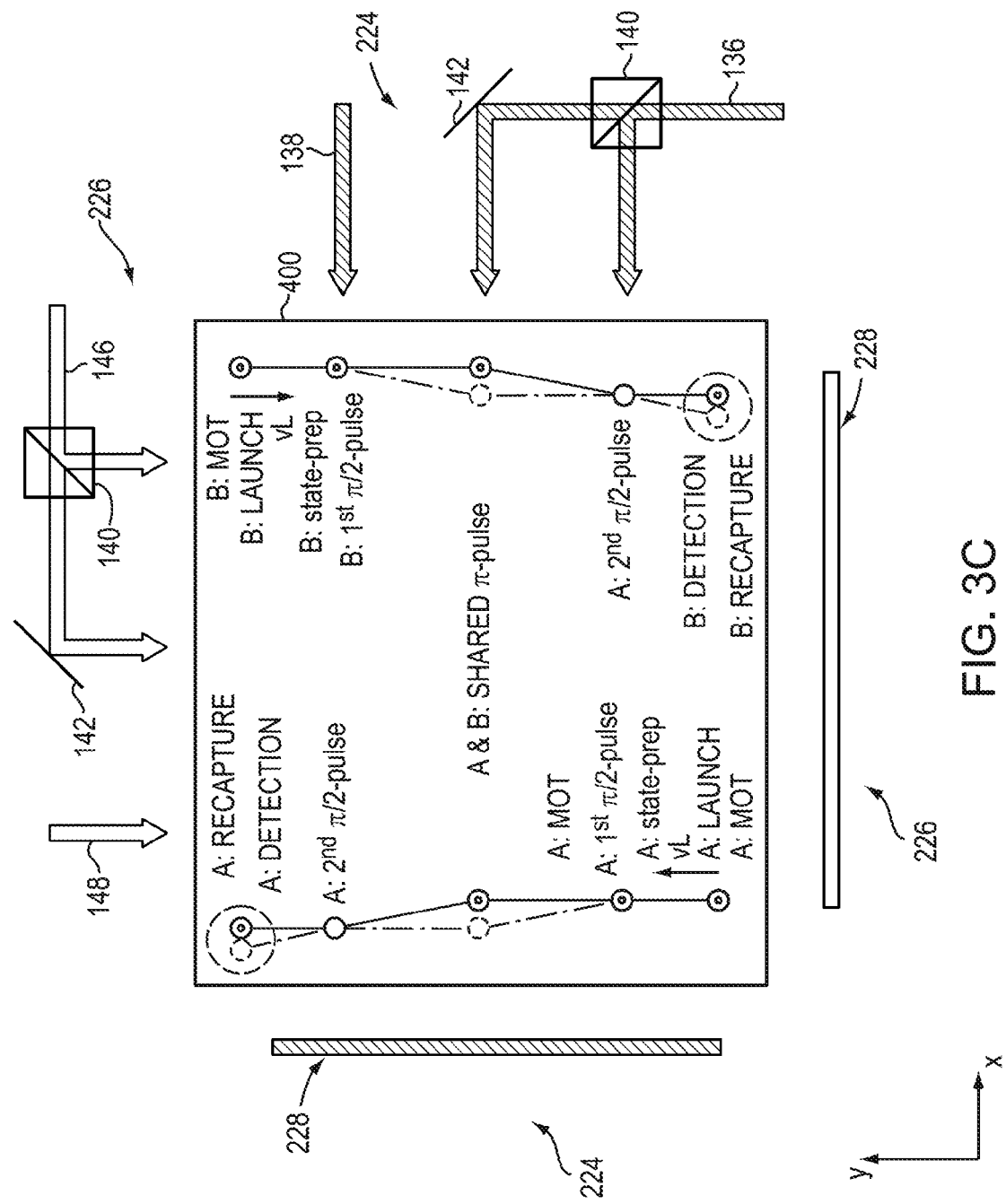

FIGS. 3A-C illustrate schematically an example of an inertial measurement apparatus based on atom interferometry, and sequence of operation thereof, according to certain aspects and embodiments. The inertial measurement apparatus 200 includes four atom interferometry regions 202, 204, 206 and 208 arranged in a ring configuration. In this example, the ring configuration is a square configuration, wherein each atom interferometry region forms one edge of the square. In other examples, the ring configuration may include another arrangement of any number of atom interferometry regions that are configured to transfer atoms between one another. For instance, the ring configuration may include a triangle configuration, a polygon configuration, or an L-shaped configuration where the atoms traverse out each arm of the L during one measurement and then return during the next, as discussed further below. The interferometers do not need to share the same plane and do not need to be orthogonal. Additionally, multiple interferometers may traverse each measurement region in either the same or opposite directions between the cooling and trapping sites.

The inertial measurement apparatus 200 includes four atom capture sites 210, 212, 214 and 216 positioned at the corners of the apparatus. Each of the atom capture sites includes a magneto-optical trap (MOT). As discussed in more detail below, and as shown in FIGS. 3A and 3B, during an interferometry sequence, two atom samples 104a, 104b, are launched in counter-propagating directions, as represented by arrows 128, 130. In particular, the apparatus 200 is configured to launch the atoms between two pairs of atom capture sites positioned at the corners of the square configuration. Since the atom motion is small at short interrogation times, the atoms can be efficiently recaptured at the next atom capture site. This enables high data rate by allowing significant re-capture between interferometer cycles, shortening the MOT loading times.

During transfer of the atom samples 104a, 104b between respective atom capture sites, a light pulse interferometry sequence is applied to the atom samples, as discussed above. Accordingly, the inertial measurement apparatus 200 further includes optical assemblies 220, 222 configured to produce the light pulses used for the atom interferometry sequences. As discussed above, the optical assemblies may serve multiple atom interferometry regions, and may also be shared with the MOT optics for trapping and cooling the atom samples at each atom capture site. For example, as shown in FIGS. 3A and 3B, a first optical apparatus 220 may serve first and third atom interferometry regions 202, 206, and a second optical apparatus 222 may serve second and fourth atom interferometry regions 204, 208.

In one implementation, the Raman beams 120a, 120b, and 120c used in the interferometry sequence 112 are formed by retro-reflecting three, spatially distinct laser beams from a common (or separate) mirror. Each laser beam contains the frequencies required to create a Raman transition. In another implementation the Raman beams 120a, 120b, 120c are formed from a single large laser beam which spans the entire atom trajectory to be used in the interferometer. In another implementation the three Raman beam pairs 120a, 120b, 120c are formed from spatially distinct laser beams which are in counter-propagation. Each beam contains one or more frequencies with at least one set of counter-propagating frequency pairs which will cause the atoms to undergo a Raman transition. The Raman laser beams may be able to have their frequencies changed in such a way as to track the Doppler shift of the atoms with respect to the instrument case. Thus all of the Raman transitions can be operated on resonance.

Referring to FIGS. 3A and 3B, in one embodiment, the three Raman beam pairs 120a, 120b, 120c of FIG. 1 may be formed from three frequency tunable sources 134, 136, 138 which allow for two distinct pairs of Raman frequencies that can be steered independently, but share one common laser beam between them. Beamsplitters 140 and fold mirrors 142 may be used to split and direct the laser beams from the frequency tunable sources to provide the three Raman beam pairs. This arrangement may be implemented in the counter-propagating (FIGS. 3A and 3B or retro-reflected geometries discussed above. FIG. 3C illustrates an example of optical assemblies 224, 226, where retro-reflectors 228 are used to replace some of the frequency tunable sources used in the optical assemblies 220, 222.

The inertial measurement apparatus 200 includes the vacuum chamber 400, and components of the optical assemblies 220 and 222 are mounted on and in the vacuum chamber 400. As discussed above, the optical assemblies may include a MOT located at each atom capture site, a plurality of light sources, and optionally a plurality of retro-reflectors. At least some of the light sources and/or retro-reflectors may be mounted outside the vacuum chamber 400. The optical assemblies may be configured to generate the required frequencies and pulse timing for the plurality of different optical paths of the recapturing ring configuration. In one example, the inertial measurement apparatus may have about 20 different optical paths.

A phase shift measurement based on the atom sample may be obtained after the atoms interfere during transit through the interferometry regions, by measuring the population of atoms in each of the output ports of the interferometer system (steps 118 and 126). The output ports may include different atomic states such as the hyperfine ground states of the alkali atom, but may also include spatially separated states in the same atomic state. The phase shift measurement may be indicative of at least one of a rotation and acceleration relative to a respective inertial axis, along with other effects such as the atoms' interaction with magnetic and optical fields.

Figure 4A:
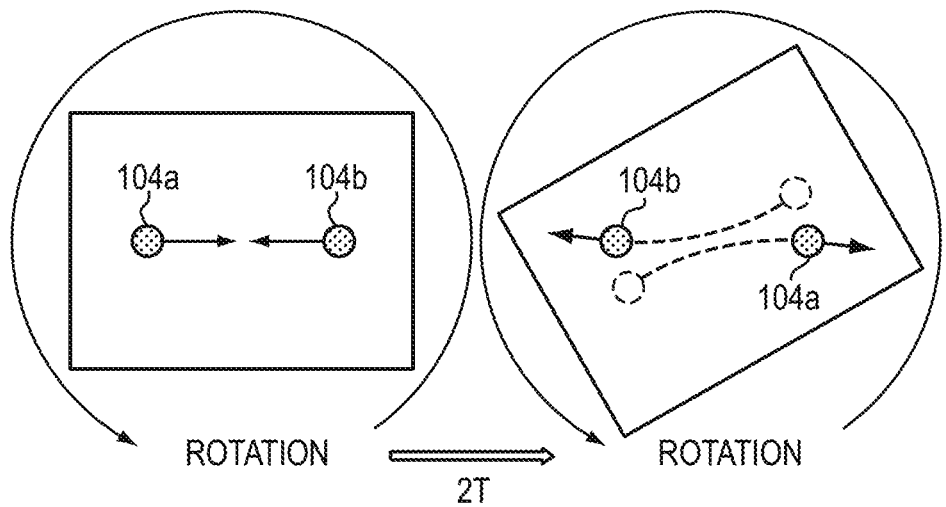
FIG. 4A is a schematic diagram illustrating a rotation measurement based on atom interferometry according to aspects of the invention.

FIG. 4A schematically illustrates a bi-directional "catch and throw" rotation measurement. As discussed above, the two atom samples 104a, 104b are launched towards one another (in counter-propagating directions). The interferometry sequence discussed above may be applied during time 2T. Deflection of the atom samples 104a, 104b at the receiving atom capture site may be measured and provides an indication of the degree of rotation of the system, according to the following equation:

$$\Omega \cong \frac{\varphi A - \varphi B}{4 k_{eff} V_L T^2} \quad (1)$$

In Equation (1) (and in Equation (2) below), $k_{eff}$ is the periodicity, $\Omega \times V_L \times T^2$ is proportional to the Coriolis deflection, and $\varphi A$ and $\varphi B$ are the measured phase shifts from the two simultaneously operated interferometers.

Figure 4B:
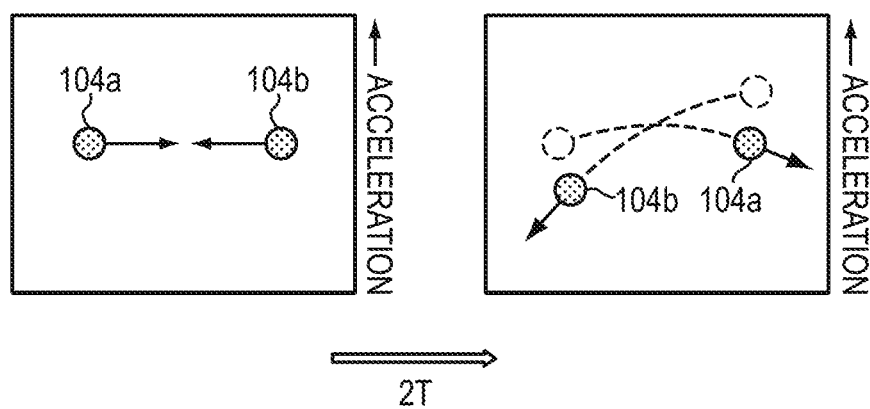
FIG. 4B is a schematic diagram illustrating an acceleration measurement based on atom interferometry according to aspects of the invention.

FIG. 4B schematically illustrates a bi-directional "catch and throw" acceleration measurement. As discussed above, the two atom samples 104a, 104b are launched towards one another (in counter-propagating directions with vL1=-vL2). The interferometry sequence discussed above may be applied during time 2T. Deflection of the atom samples 104a, 104b at the receiving atom capture site may be measured and provides an indication of the acceleration of the system according to the following equation:

$$a \cong \frac{\varphi A + \varphi B}{k_{eff} T^2} \quad (2)$$

In Equation (2), $a \times T^2$ is proportional to the acceleration deflection.

Additionally, the measurement may include four simultaneous measurements, where each arm contains two counter propagating atomic samples which all interact with the same optical beam paths, though the light may be at different frequencies.

Such rotation and acceleration measurements may be made using the inertial measurement apparatus 200 of FIGS. 3A-C. The inertial measurement apparatus 200 may thus provide a combined atomic gyroscope and atomic accelerometer based on the recapturing configuration, as the two oppositely launched atom samples (reciprocal operation) allow distinguishing between acceleration and rotation, for example by distinguishing between acceleration and rotation induced phase shifts.

FIG. 3A illustrates an example of the operation of the inertial measurement apparatus 200 based on atom interferometry of the first atom sample 104a and the second atom sample 104b launched in counter-propagating directions to provide measurements corresponding to a first inertial axis. In the illustrated example, the first inertial axis is the x axis, and the atom samples 104a, 104b are launched with an initial velocity $V_L$ along the x axis ($V_L x$). Referring to FIGS. 3A and 3B, the first atom sample 104a is shown to be captured initially at the first atom capture site 210, and the second atom sample 104b is shown to be captured initially at the third atom capture site 214. The atom samples 104a, 104b may initially be captured from a source external to the atom interferometry regions. After the two atom samples 104a, 104b are captured at the atom capture sites 210 and 214, the two atom samples (also referred to as clouds) are launched with equal and opposite velocities, $V_L$, in the x direction towards the second atom capture site 212 and fourth atom capture site 216, respectively. During transfer of the atom samples between respective atom capture sites, a three Raman pulse interferometry sequence is applied to the atom samples. The light pulse sequence may be the pi/2-pi-pi/2 pulse sequence illustrated in FIG. 1 and described above. In other examples, other pulse sequences may be used, and methods of interaction with the atom other than Raman transitions may also be used. It is only necessary to create an inertially sensitive signal.

In the illustrated example, the light pulse sequence is applied to atom samples transferring through the first atom interferometry region 202 and the third atom interferometry region 206 that is arranged substantially parallel to the first atom interferometry region. The first atom interferometry region 202 is disposed between the first atom capture site 210 and the second atom capture site 212 and the third atom interferometry region 206 is disposed between the third atom capture site 214 and a fourth atom capture site 216. Accordingly, the atom samples 104a, 104b are launched along respective propagation axes that are substantially parallel. Thus, the first atom capture site 210 provides the first atom sample 104a to the first atom interferometry region 202. The light pulse sequence of FIG. 1 may be applied to the first atom sample 104a as the atom sample traverses the first atom interferometry region 202 (as shown in FIG. 3A) so as to generate a first measurement corresponding to the first inertial axis (in this case, the x axis) based on the first atom sample. Similarly, the third atom capture site 214 provides the second atom sample 104b to the third atom interferometry region 206. The light pulse sequence of FIG. 1 may be applied to the second atom sample 104b as the atom sample traverses the third atom interferometry region 206 (as shown in FIG. 3A), so as to generate a further measurement corresponding to the first inertial axis based on the second atom sample.

In one embodiment, the first optical assembly 220 is configured to apply the same light pulse sequence substantially simultaneously to both the first atom interferometry region 202 and the third atom interferometry region 206. The second optical apparatus 222 may not be used for the measurements along the x-axis. The light pulse sequence may result in atom beam deflection along the x-axis. A plurality of measurements, such as phase shift measurements may be generated based on the atom interferometry of the two atom samples. The measurements may be indicative of a rotation rate ($\Omega_z$) and acceleration ($a_x$).

Thus, FIG. 3A illustrates the apparatus 200 configured to perform as a $V_{Ly}$, $\Omega_z$, $a_x$ atom interferometer.

As shown in FIG. 3A, at the end of the measurement, the two atom samples are recaptured in another pair of atom capture sites (MOTs) orthogonal to the initial pair of atom capture sites. The recaptured atom samples may then be provided to respective atom interferometry regions to generate measurements corresponding to a different set of inertial axes, as shown in FIG. 3B, for example. The process thus repeats to sequentially generate measurements corresponding to different inertial axes. As shown in FIG. 3A, the first atom sample provided by the first atom capture site 210 to the first atom interferometry region 202 is recaptured by the second atom capture site 212. The second atom capture site 212 may then provide the first atom sample 104a to the second atom interferometry region 204, as shown in FIG. 3B. Similarly, the second atom sample 104b provided by the third atom capture site 210 to the third atom interferometry region 206 is recaptured by the fourth atom capture site 216. The fourth atom capture site 216 may then provide the second atom sample 104b to the fourth atom interferometry region 208, as shown in FIG. 3B. The second and fourth atom interferometers may then apply a light pulse sequence to the atom samples to generate a plurality of measurements, which may be indicative of rotation relative to a second axis.

FIG. 3B illustrates an example of sequential operation of the apparatus 200 of FIG. 3A, wherein the two atom samples 104a and 104b are recaptured and provided to respective atom interferometry regions in substantially counter-propagating directions. Similar to FIG. 3A, the atom samples may be provided to the respective atom interferometry regions along propagation axes that are substantially parallel. Referring to FIG. 3B, the measurement sequence described above with reference to FIG. 3A may be repeated with a launch along the x-axis and atom deflection along the y-axis, which provides measurements which may be indicative of a rotation rate ($\Omega_z$) and acceleration ($a_y$). Thus, FIG. 3B illustrates the apparatus 200 configured to perform as a $V_{Lx}$, $\Omega_z$, $a_y$ atom interferometer. After the two atom samples 104a, 104b are captured at the atom capture sites 210 and 214, the two atom samples (also referred to as clouds) are launched with equal and opposite velocities in the y-direction as shown in FIG. 3B. The two atom samples 104a, 104b are launched in counter-propagating directions along the x-axis as indicated by the arrows 128, 130 in FIG. 3B. As shown in FIG. 3B, the second optical apparatus 222 applies the light pulse sequence of FIG. 1 to the first atom sample 104a as the atom sample traverses the second atom interferometry region 204, so as to generate a second measurement corresponding to a second inertial axis (in this case, the y axis) based on the first atom sample. Similarly, the light pulse sequence of FIG. 1 is applied by the second optical apparatus 222 to the second atom sample 104b as the atom sample traverses the fourth atom interferometry region 208, so as to generate a further measurement corresponding to the second inertial axis based on the second atom sample.

After applying the light pulse sequence (e.g., the light pulse sequence described above with reference to FIG. 1), the population of atoms in each of the hyperfine ground states may be determined by laser induced fluorescence (LIF), for example by using the detection photodiodes. This process is then repeated for the next orthogonal axis, as discussed above.

FIGS. 3A and 3B thus illustrate the sequential operation of an atomic gyroscope. The atomic gyroscope sequentially provides a first plurality of measurements corresponding to a plurality of orthogonal inertial axes based on interference of the first atom sample 104a. The atomic gyroscope further sequentially provides a second plurality of measurements corresponding to a plurality of orthogonal inertial axes based on interference of the second atom sample 104b. The first plurality of measurements and the second plurality of measurements may be provided substantially simultaneously due to the reciprocal operation of the atomic gyroscope using two atom samples so as to provide measurements indicative of at least one of rotation and acceleration relative to an inertial reference frame.

Figure 5A:
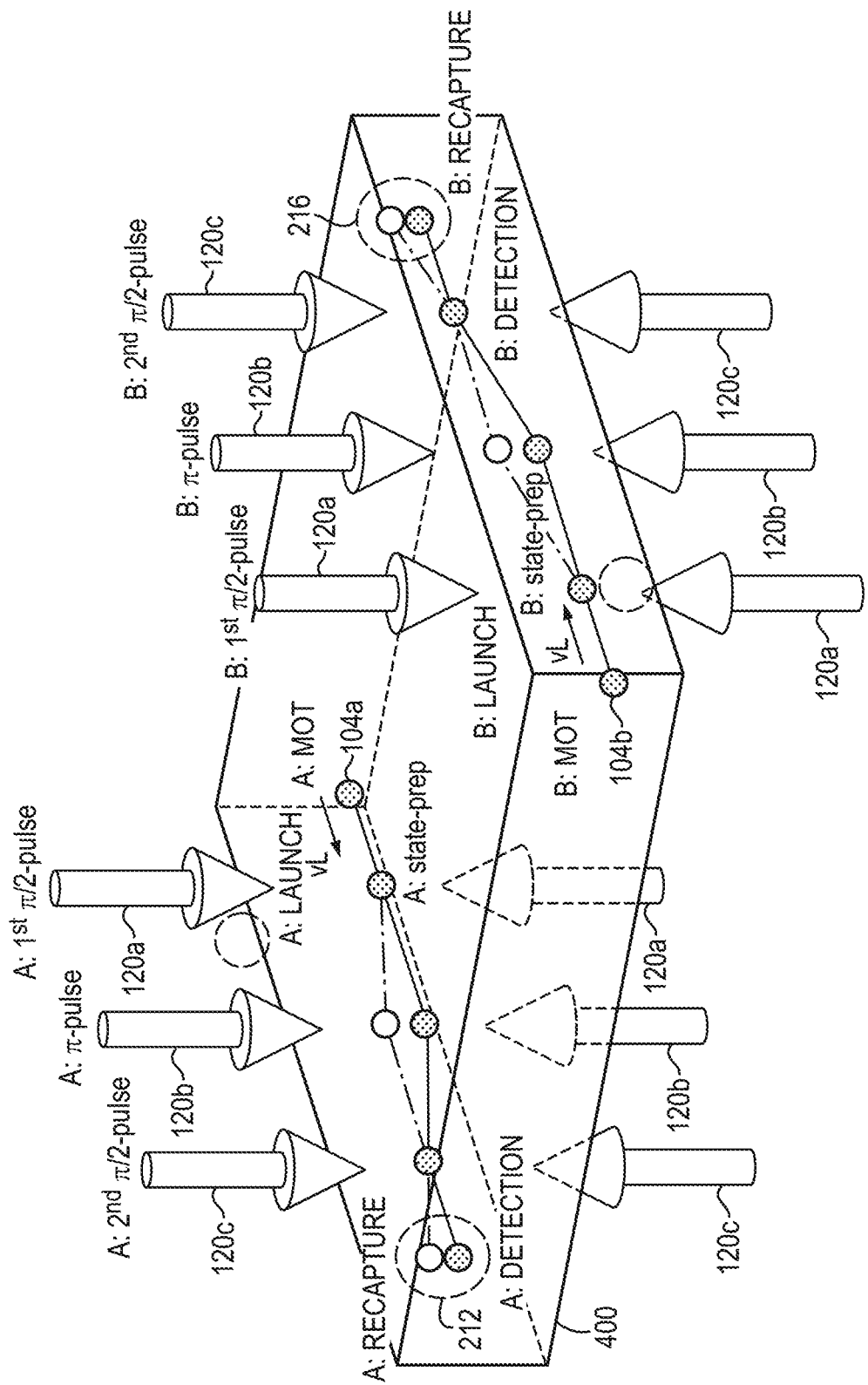
FIGS. 5A and 5B are schematic diagrams illustrating a three dimensional view of another configuration of the inertial measurement apparatus of FIGS. 3A-C, according to aspects of the present invention.
Figure 5B:
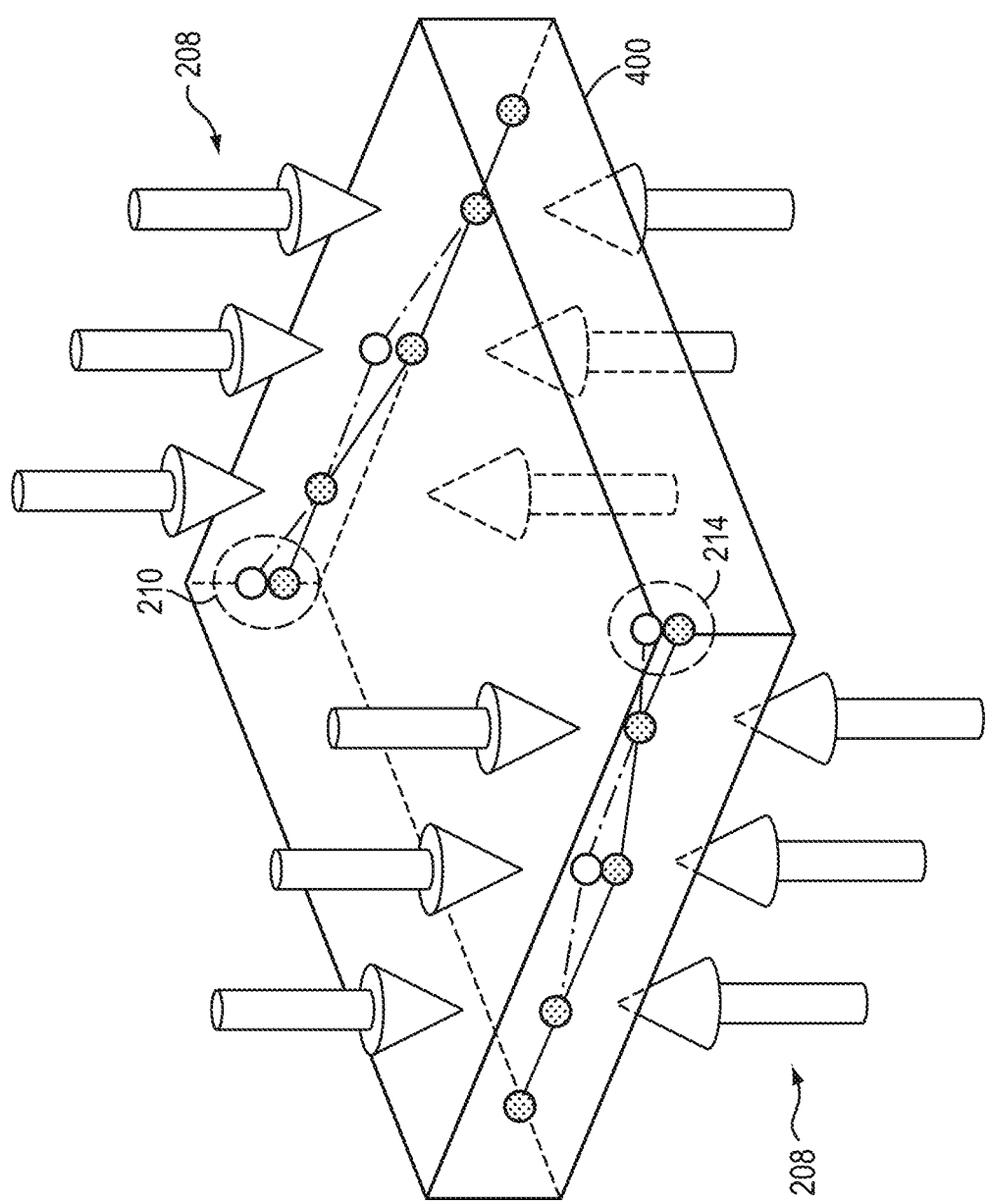

While the above sequence of operation described with reference to FIGS. 3A and 3B refers to measurements corresponding to two inertial axes (the x and y axes in the illustrated examples), it is to be appreciated that the atomic gyroscope of FIGS. 3A and 3B may further provide a third plurality of measurements corresponding to a third inertial axis, e.g., the z axis. In particular, referring to FIGS. 5A and 5B, the measurement sequences described above may be repeated two more times with launch along the x-axis (FIG. 5A) and y-axis (FIG. 5B) and deflection in the z-axis. This provides measurements which may be indicative of a rotation rate ($\Omega_y$), ($\Omega_x$) and acceleration ($a_z$) respectively.

Thus, the configuration of the apparatus 200 provides an atomic gyroscope, or a combination of an atomic gyroscope and an atomic accelerometer.

The inertial measurement apparatus 200 provides a novel sequential sampling and recapturing atomic gyroscope. An atomic gyroscope based on atom interferometry as disclosed herein is a Coriolis force ($\Omega \times v$) sensor, which requires the atoms to have an initial velocity, for example with respect to a housing of the inertial measurement apparatus (as shown for example by the launch velocity $V_L$ in FIGS. 3A and 3B).

Embodiments of the present disclosure may provide light pulse atom interferometers that may operate as a combined gyroscope and accelerometer and provide sequential operation in all three axes, thereby providing a 6 DOF inertial measurement apparatus. As discussed above, the light pulse atom interferometers may use Raman or Bragg transitions, or any other light pulse technique that creates an inertially sensitive signal. The apparatus may be configured to interrogate each of the three orthogonal axes using a reciprocal configuration consisting of two atom samples launched in opposite directions. The apparatus enables rapid operation by recapturing the atoms used to generate measurements corresponding to a different axis.

The ring configuration further allows for a compact vacuum chamber, thereby reducing the volume of the apparatus. In some embodiments, a single vacuum chamber may house the multiple atom capture sites and the atom interferometers. In some embodiments, the atomic inertial measurement apparatus may be included within a miniature (approximately 10 $cm^3$) vapor cell. Furthermore, each atom capture site is configured to recapture atoms received from a respective interferometer, and each atom capture site may be shared by multiple atom interferometers. The recapturing configuration reduces component count and complexity and reduces the volume of the apparatus while maintaining a high bandwidth and response time of the apparatus, for example by sharing the atom capture sites among the different LPAI axes.

Figure 6A:
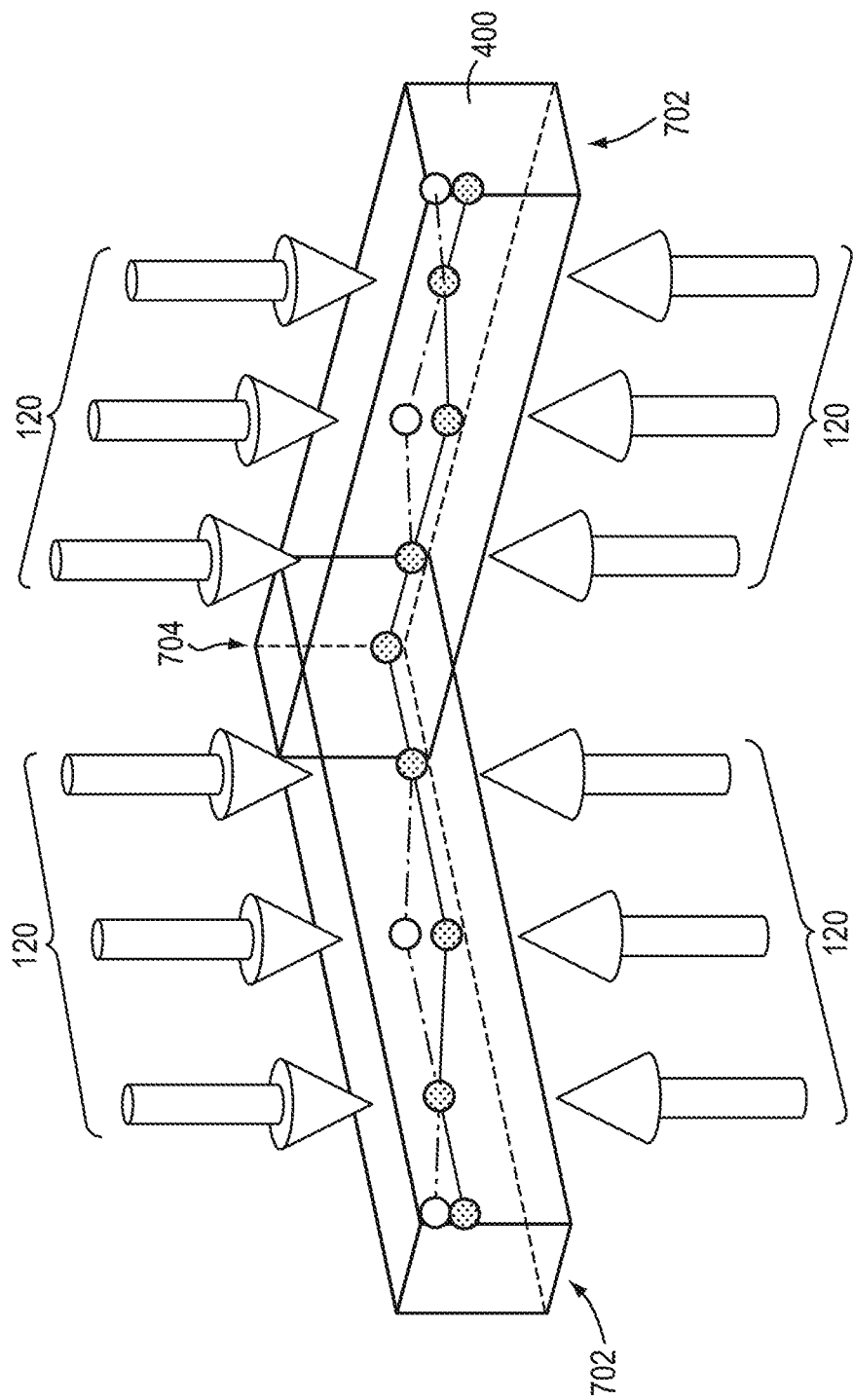
FIG. 6A is a schematic diagram illustrating one example of an L-shaped architecture for a sequential ring gyroscope according to aspects of the invention.
Figure 6B:
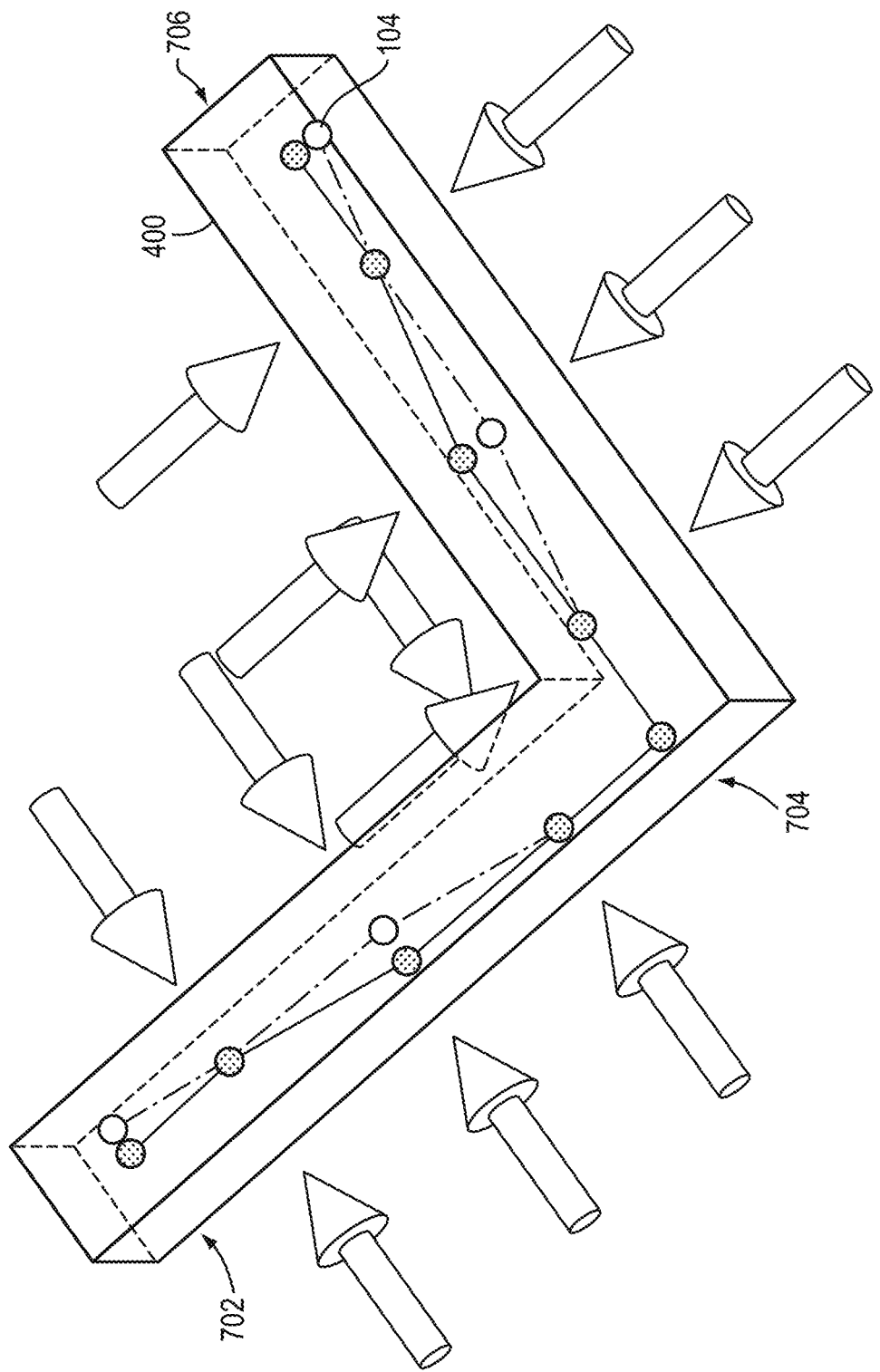
FIG. 6B a schematic diagram illustrating another example of an L-shaped architecture for a sequential ring gyroscope according to aspects of the invention.
Figure 6C:
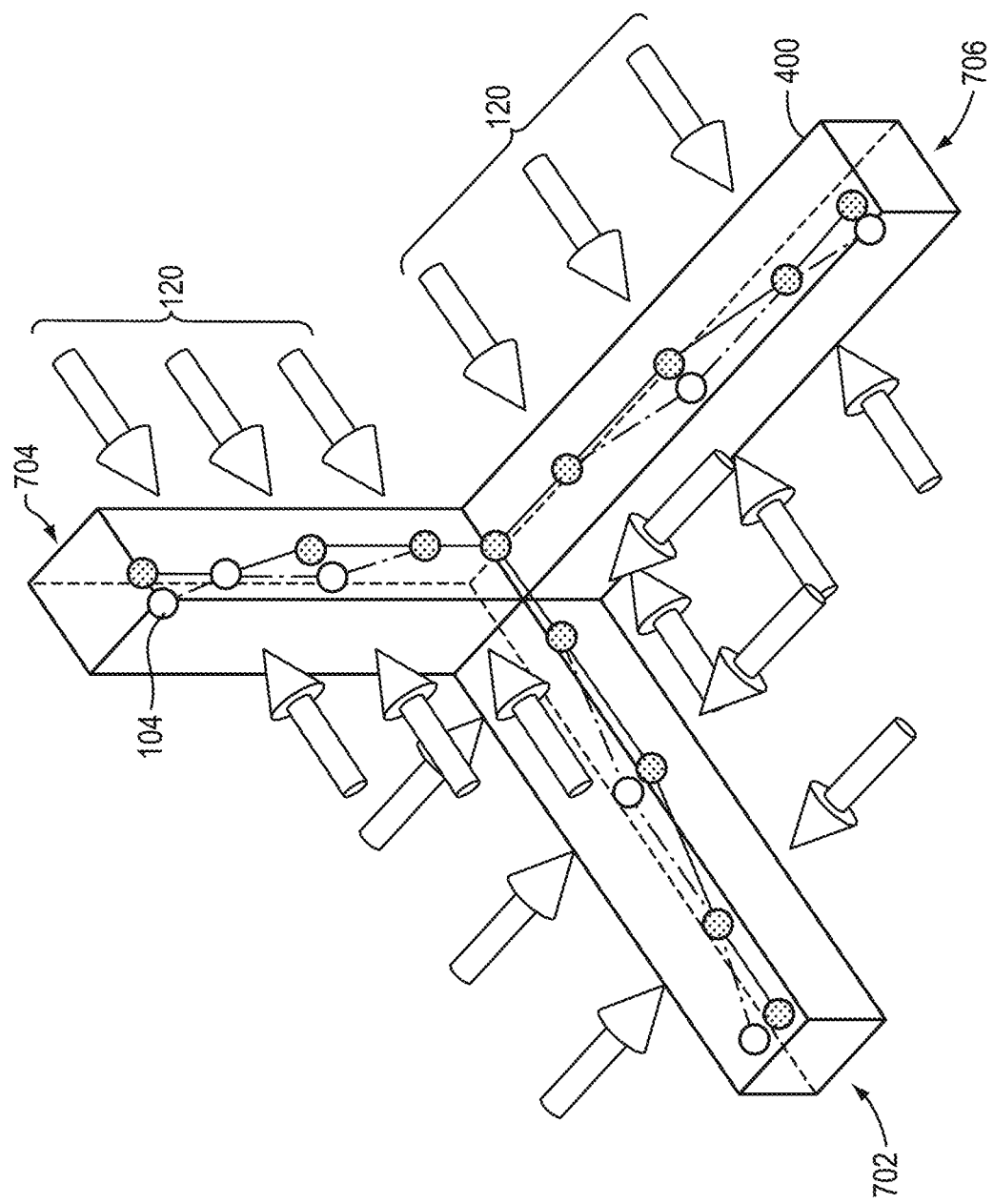
FIG. 6C is a schematic diagram illustrating another example of an L-shaped architecture having a common vertex, according to aspects of the invention.

The examples illustrated in FIGS. 3A-C, 5A, and 5B have the ring architecture for the inertial measurement apparatus arranged in a "square" with four atom capture sites. As discussed above, there are several other arrangements for the ring architecture that may be implemented. For example, FIGS. 6A-C illustrate examples of an "L-shaped" geometry. In each of the geometries illustrated in FIGS. 6A-C, the system includes three atom capture sites 702, 704, 706, each site including a MOT for trapping and cooling of the atom samples, as discussed above. The three MOTs are contained in a single vacuum chamber 400, as also discussed above. In certain examples, the system has common MOT and interferometer optical beams, and the same optics (e.g., optical assemblies 220 and 222) may be may be shared to implement the MOT trapping function and the interferometry light pulse sequence 120. In other examples, separate optical assemblies may be used to produce the MOT beams and the interferometry (LPAI) beams. FIG. 6A illustrates an example of an out-of-plane L-shaped geometry in which the system is configured to measures ($\Omega x$), (az), ($\Omega y$), and (az). FIG. 6B illustrates an example of an in-plane L-shaped geometry in which the system is configured to measures ($\Omega z$), (ax), ($\Omega z$), and (ay). FIG. 6C illustrates an example of a shared-vertex, out-of-plane L-shaped geometry in which the system is configured to measure ($\Omega z$), (ax), ($\Omega z$), (ay), ($\Omega x$), and (ay). An additional measurement sequence will provide ($\Omega y$), (az), ($\Omega x$), (az), ($\Omega y$), and (ax).

Figure 7:
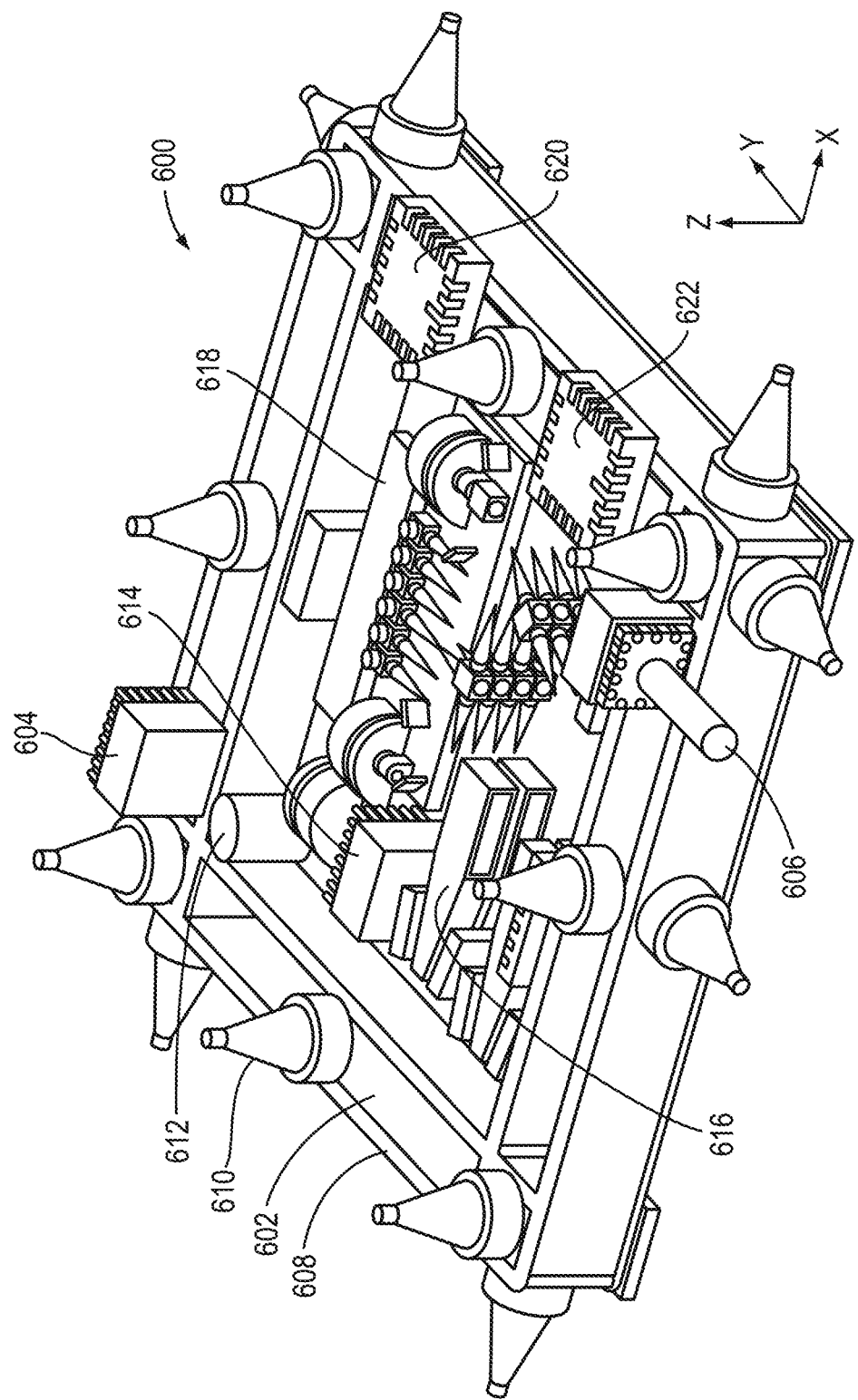
FIG. 7 is a diagram of another example of an inertial measurement apparatus according to aspects of the present invention.

According to certain embodiments, an inertial measurement apparatus having atomic inertial sensors configured according to aspects disclosed herein may further include MEMS or other inertial sensors to supplement the atomic sensors. As shown in FIG. 7, for example, the apparatus 600 further includes a MEMS gyroscope 620 and a MEMS accelerometer 622. In some embodiments, one or more MEMS sensors may continuously sample all axes, for example to prevent loss of inertial information during intervals of high dynamics. In some embodiments, the atomic inertial sensor (gyroscope and/or atomic accelerometer) may need to only operate fast enough to constrain the MEMS bias drift. The inclusion of one or more MEMS inertial sensors may allow for significant volume reduction of the atomic inertial sensor by sequentially sampling each axis using a single atomic sensor configured according to one or more features disclosed, rather than using three sensors operating simultaneously for each of the three axes.

In one example, an inertial measurement apparatus including a plurality of atom interferometers having corresponding optics and arranged in a ring configuration within a vacuum chamber, wherein the inertial measurement apparatus further includes one or more MEMS sensors as shown for example in FIG. 7.

In one embodiment, an inertial measurement apparatus may include an atomic sensor having a sequentially sampled recapturing 6 DOF light-pulse atom interferometer configuration. The inertial measurement apparatus may further include three high-dynamic range, precision MEMS accelerometers, and three sensitive MEMS gyroscopes. The atomic sensor may serve as an inertial reference to the MEMS sensors. These MEMS sensors may be periodically disciplined by the atomic sensor to limit the error bound in the MEMS sensors. In various embodiments, measurements from a MEMS inertial sensor may be combined with measurements from an atomic sensor disclosed herein by using various signal processing and algorithmic technique. A processor may be configured to combine measurements from the atomic and MEMS sensors. Combination of an atomic sensor as described herein with a MEMS sensor may provide a compact, high bandwidth and accurate inertial measurement apparatus.

In various embodiments, an inertial measurement apparatus, such as the entire apparatus 600 of FIG. 7, may be enclosed in a magnetic shield, and thermally isolated from the environment. In one embodiment, the magnetic shield may be leveraged to provide a thermal enclosure. A vibration isolation system may be provided to ensure shock survivability of the apparatus.

According to another aspect, various methods of providing inertial measurements based on atom interferometry are implemented, as described above with reference to FIGS. 1 to 7. For example, a method for providing inertial measurements based on atom interferometry may include capturing a plurality of distinct atom samples (e.g., step 102 in FIG. 2), including at least a first atom sample and a second atom sample, sequentially generating a first plurality of measurements corresponding to a plurality of orthogonal inertial axes based on interference of the first atom sample (steps 114-126), and sequentially generating a second plurality of measurements corresponding to the plurality of orthogonal inertial axes based on interference of the second atom sample (repeating steps 114-126). Sequentially generating the first plurality of measurements and sequentially generating the second plurality of measurements may be performed in parallel.

Thus, aspects and embodiments may provide a compact, optionally zero-dead-time, inertial measurement system based on LPAI by using multiple embodiments of the methods described above. While a typical LPAI measurement requires preparation of a new cold atomic sample, which can result in several ms to several seconds of dead-time, the recapturing configuration disclosed herein significantly reduces atom sample capture and MOT preparation dead-time by allowing recapture of the atom samples received from a respective atom interferometer and by operating two reciprocal atom interferometers in a racetrack configuration. Thus, the recapturing configuration allows reduction of dead-time associated with atom sample cooling and trapping, which may compensate for additional dead-time due to sequential sampling of the inertial axes. Additionally, the inclusion of MEMS sensors may further enhance the capability of an inertial measurement system, as discussed above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. An inertial measurement apparatus based on atom interferometry and comprising:
   a vacuum chamber;
   a plurality of atom interferometers including at least a first atom interferometer and a second atom interferometer, the first atom interferometer being configured to generate a first measurement corresponding to a common inertial input based on a first atom sample, and the second atom interferometer being configured to generate a second measurement corresponding to the common inertial input; and a plurality of atom capture sites housed within the vacuum chamber, the plurality of atom capture sites including at least a first atom capture site and a second atom capture site, the first atom capture site being configured to capture the first atom sample and to provide the first atom sample to the first atom interferometer, and the second atom capture site being configured to recapture the first atom sample from the first atom interferometer, following the first measurement, and to provide the first atom sample to the second atom interferometer, the second atom capture site being further configured to capture a second atom sample different from the first atom sample and to provide the second atom sample to a respective atom interferometer of the plurality of atom interferometers.

2. The inertial measurement apparatus of claim 1, wherein the second atom capture site is configured to provide the second atom sample to the respective atom interferometer along a propagation axis substantially parallel to that of the first atom sample and in a direction substantially counter-propagating relative to a direction of travel of the first atom sample.

3. The inertial measurement apparatus of claim 1, wherein the first atom interferometer is disposed substantially orthogonal to the second atom interferometer, and the second atom capture site is disposed between the first atom interferometer and the second atom interferometer.

4. The inertial measurement apparatus of claim 1, wherein the plurality of atom interferometers form an atomic gyroscope configured to:

sequentially provide a first plurality of phase shift measurements corresponding to a plurality of orthogonal inertial axes based on interference of the first atom sample, and sequentially provide a second plurality of phase shift measurements substantially simultaneously with providing the first plurality of phase shift measurements, the second plurality of phase shift measurements corresponding to the plurality of orthogonal inertial axes and being based on interference of the second atom sample; and combine the first and second pluralities of phase shift measurements to determine an inertial input to the inertial measurement apparatus.

5. The inertial measurement apparatus of claim 1, wherein the plurality of atom interferometers further includes a third atom interferometer configured to generate a third measurement corresponding to the common inertial input based on the first atom sample, the third measurement providing information different from the first and second measurements; and the plurality of atom capture sites further includes a third atom capture site configured to recapture the second atom sample received from the second atom interferometer and to provide the second atom sample to the third atom interferometer.

6. The inertial measurement apparatus of claim 5, wherein the plurality of atom capture sites are arranged in a ring configuration;

wherein each atom interferometer of the plurality of atom interferometers is disposed between a respective pair of atom capture sites of the plurality of atom capture sites; and wherein the first atom capture site is further configured to recapture the first atom sample received from the third atom interferometer and to provide the first atom sample that is recaptured to the first atom interferometer.

7. The inertial measurement apparatus of claim 5, wherein the plurality of atom interferometers further includes a fourth atom interferometer configured to generate a further measurement corresponding to the common inertial axis based on the second atom sample, the fourth atom interferometer being aligned substantially parallel to the second atom interferometer;

wherein the plurality of atom capture sites further includes a fourth atom capture site configured to recapture the second atom sample from the third atom interferometer and to provide the second atom sample to the fourth atom interferometer; and wherein the first atom capture site is further configured to recapture the second atom sample from the fourth atom interferometer and to provide the second atom sample to the first atom interferometer.

8. The inertial measurement apparatus of claim 1, wherein at least two atom capture sites of the plurality of atom capture sites are configured to launch distinct atom samples substantially simultaneously; and wherein at least two atom interferometers of the plurality of atom interferometers are configured to receive the distinct atom samples and to operate substantially simultaneously to generate a plurality of phase shift measurements based on the distinct atom samples.

9. The inertial measurement apparatus of claim 1, wherein each atom interferometer of the plurality of atom interferometers is configured to allow transfer of atoms between respective atom capture sites of the plurality of atom capture sites, and wherein each atom interferometer includes an optical assembly configured to provide a light pulse sequence to atoms being transferred between the respective atom capture sites.

10. The inertial measurement apparatus of claim 9, wherein the light pulse sequence is a pi/2-pi-pi/2 Raman pulse sequence.

11. The inertial measurement apparatus of claim 9, wherein each atom interferometer is configured to provide the light pulse sequence configured to cause inertially sensitive atom interference.

12. A method for providing inertial measurements based on atom interferometry, the method comprising:

capturing a plurality of distinct atom samples by a plurality of atom capture sites, the plurality of atom samples including at least a first atom sample and a second atom sample;

sequentially generating a first plurality of measurements corresponding to a plurality of orthogonal inertial axes based on interference of the first atom sample using a plurality of atom interferometers; and sequentially generating a second plurality of measurements corresponding to the plurality of orthogonal inertial axes based on interference of the second atom sample using the plurality of atom interferometers;

wherein the plurality of atom capture sites and the plurality of atom interferometers are arranged in series in a ring configuration, each atom capture site being disposed between adjacent atom interferometers of the plurality of atom interferometers.

13. The method of claim 12, wherein sequentially generating the first plurality of measurements and sequentially generating the second plurality of measurements are performed substantially in parallel.

14. The method of claim 12, further comprising:
determining at least one of rotation and acceleration relative to the inertial axes based on at least one of the first plurality of measurements and the second plurality of measurements.

15. The method of claim 12, further comprising:
sequentially recapturing the first atom sample to allow sequentially generating the first plurality of measurements; and
sequentially recapturing the second atom sample to allow sequentially generating the second plurality of measurements.

16. The method of claim 12, further comprising:
cycling the first atom sample in the ring configuration; and
cycling the second atom sample in the ring configuration along a direction reciprocal to that of the first atom sample.

17. The method of claim 12, further comprising:
launching the first atom sample in a first atom interferometer of the plurality of atom interferometers to generate a first measurement of the first plurality of measurements; and
launching the second atom sample in a second atom interferometer of the plurality of atom interferometers, the second atom interferometer being disposed parallel to the first atom interferometer to generate a first measurement of the second plurality of measurements;
wherein the first atom sample and the second atom sample are launched in opposite directions; and
wherein launching the first atom sample and the second atom sample include launching the first atom sample and the second atom sample with a substantially same velocity.

18. The method of claim 12, wherein capturing the plurality of distinct atom samples includes capturing the first atom sample by a first atom capture site of the plurality of atom capture sites and capturing the second atom sample by another one of the plurality of atom capture sites;
the method further comprising:
providing the first atom sample to a first atom interferometer of the plurality of atom interferometers;
generating by the first atom interferometer a first measurement corresponding to a first inertial axis based on the first atom sample;
recapturing the first atom sample from the first atom interferometer by a second atom capture site of the plurality of atom capture sites;
providing the first atom sample to a second atom interferometer of the plurality of atom interferometers;
generating by the second atom interferometer a second measurement corresponding to a second inertial axis based on the first atom sample; and
providing the second atom sample to a respective atom interferometer of the plurality of atom interferometers.

19. The method of claim 18, wherein capturing the first atom sample and capturing the second atom sample are performed substantially in parallel; and
wherein providing the first atom sample to the first atom interferometer and providing the second atom sample to the respective atom interferometer are performed substantially in parallel.

20. The method of claim 18, wherein providing the first atom sample to the first atom interferometer further includes launching the first atom sample, and providing the second atom sample to the respective atom interferometer further includes launching the second atom sample in a direction substantially counter-propagating relative to the first atom sample.

21. The method of claim 18, further comprising:
recapturing the first atom sample from the second atom interferometer by a third atom capture site of the plurality of atom capture sites;
providing the first atom sample to a third atom interferometer of the plurality of atom interferometers; and
generating by the third atom interferometer a third measurement corresponding to a third inertial axis based on the first atom sample.

22. The method of claim 12, further comprising:
providing a light pulse sequence to atoms of the first atom sample; and
providing the light pulse sequence to atoms of the second atom sample.

23. The method of claim 22, wherein the light pulse sequence is a pi/2-pi-pi/2 Raman pulse sequence.

24. An inertial measurement system comprising:
a vacuum chamber;
a first light pulse atom interferometer (LPAI) disposed within the vacuum chamber and including first and second atom capture sites, and a first atom interferometry region disposed between the first and second atom capture sites, the first LPAI configured to launch first and second atom samples counter-propagating through the first atom interferometry region from the first and second atom capture sites, respectively, the first atom capture site being configured to recapture the second atom sample after its transit through the first atom interferometry region, and the second atom capture site being configured to recapture the first atom sample after its transit through the first atom interferometry region; and
a first optical apparatus configured to generate a light pulse sequence in the first atom interferometry region;
wherein the first LPAI configured to generate first inertial measurements based on interactions of the first and second atom samples with the light pulse sequence in the first atom interferometry region.

25. The inertial measurement system of claim 24, further comprising:
a second light pulse atom interferometer (LPAI) disposed within the vacuum chamber and including third and fourth atom capture sites, and a second atom interferometry region disposed between the third and fourth atom capture sites, the second LPAI configured to launch third and fourth atom samples counter-propagating through the second atom interferometry region from the third and fourth atom capture sites, respectively, the third atom capture site being configured to recapture the fourth atom sample after its transit through the second atom interferometry region, and the fourth atom capture site being configured to recapture the third atom sample after its transit through the second atom interferometry region; and
a second optical apparatus configured to generate the light pulse sequence in the second atom interferometry region;
wherein the second LPAI is configured to generate second inertial measurements based on interactions of the third and fourth atom samples with the light pulse sequence in the second atom interferometry region.

26. The inertial measurement system of claim 25, wherein the light pulse sequence includes one of a pi/2-pi-pi/2 Raman sequence and a sequence of Bragg transitions.

* * * * *